(12) United States Patent
Bernard et al.

(10) Patent No.: US 9,721,052 B1
(45) Date of Patent: Aug. 1, 2017

(54) CONCURRENT DESIGN PROCESS

(71) Applicant: Cadence Design Systems, Inc., San Jose, CA (US)

(72) Inventors: Patrick Bernard, Chelmsford, MA (US); Sean Bergan, Andover, MA (US); George Malcolm Buzzell, Burlington, MA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 14/837,551

(22) Filed: Aug. 27, 2015

(51) Int. Cl.
*G06F 17/50* (2006.01)

(52) U.S. Cl.
CPC ................ *G06F 17/5068* (2013.01)

(58) Field of Classification Search
CPC .......... G06F 17/5054; G06F 17/30348; G06F 2217/04
USPC ....................... 716/100, 102, 139
See application file for complete search history.

(56) References Cited

U.S. PATENT DOCUMENTS

| | | | |
|---|---|---|---|
| 7,392,494 B2* | 6/2008 | Lin et al. | G06F 17/5031 716/124 |
| 7,546,571 B2* | 6/2009 | Mankin et al. | G06F 17/5045 700/103 |
| 7,590,963 B2 | 9/2009 | Petunin | |
| 7,747,973 B2* | 6/2010 | Lin et al. | G06F 17/5031 716/113 |
| 8,316,342 B1* | 11/2012 | Kukal et al. | G06F 17/5045 703/13 |
| 8,326,926 B2 | 12/2012 | Sangem et al. | |
| 8,892,404 B2* | 11/2014 | Potter et al. | G06F 17/50 703/1 |

\* cited by examiner

*Primary Examiner* — Sun Lin
(74) *Attorney, Agent, or Firm* — Mark H. Whittenberger, Esq.; Holland & Knight LLP

(57) ABSTRACT

The present disclosure relates to a system and method for multi-user, at least partially concurrent, electronic circuit design. Embodiments may include displaying, at a first client computing device associated with a first user, at least a portion of an electronic circuit design, wherein the electronic circuit design is accessible by multiple users in an at least partially concurrent manner. Embodiments may further include processing a command at the first client computing device from the first user and receiving a temporary update from a server computing device, wherein the temporary update corresponds to a second user associated with a second client computing device. Embodiments may also include displaying, at the first client computing device, an operation corresponding to the received temporary update.

20 Claims, 33 Drawing Sheets

3300

```

#       file: D:/Project/TestScript.scr
#       start time: Mon
#       Version:
version setwindow pcb
trapsize 19
etchedit
pick grid 2 4047
add connect
pick grid 35 3993
pick grid 494 3993
muupdate 16348823
pick grid 559 4056
pick grid 656 4055
etchedit
pick grid 3 3890
add connect
pick grid 5 3824
pick grid 575 3803
pick grid 592 3876
mouse_pos 626 3902
pick grid 626 3902
etchedit
prepopup 643 3901 stop time: Mon
```

FIG. 33

CONCURRENT DESIGN PROCESS

FIELD OF THE INVENTION

The present disclosure relates to electronic design automation (EDA), and more specifically, to a method for allowing multiple users, who may be geographically dispersed, to operate on and/or edit an electronic design.

DISCUSSION OF THE RELATED ART

EDA utilizes software tools that may be used in the design and analysis of numerous electronic systems such as printed circuit boards (PCBs) and integrated circuits (ICs). Recent years have seen unprecedented expansion of functional requirements for PCB designs. Some EDA tools may be configured to operate upon extremely complex and involved designs that may require the attention of multiple designers each of whom may be physically located in different areas throughout the world.

SUMMARY OF INVENTION

In one or more embodiments of the present disclosure, a computer-implemented method for multi-user, at least partially concurrent, electronic circuit design is provided. The method may include displaying, at a first client computing device associated with a first user, at least a portion of an electronic circuit design, wherein the electronic circuit design is accessible by multiple users in an at least partially concurrent manner. The method may include processing a command at the first client computing device from the first user and receiving a temporary update from a server computing device, wherein the temporary update corresponds to a second user associated with a second client computing device. The method may further include displaying, at the first client computing device, an operation corresponding to the received temporary update.

One or more of the following features may be included. In some embodiments, the temporary update may include one or more temporary objects and wherein the one or more temporary objects includes a partial representation of a database object. The method may further include transmitting, from the first client computing device, a temporary update from the first client computing device to the server computing device. In some embodiments, the one or more temporary objects may correspond to real objects in an internal memory model and wherein the internal memory model may include a memory copy of the electronic circuit design that is accessible by both the first client computing device and the server computing device. The temporary update may include a plurality of temporary updates received in real-time, in the order in which they are received at the server computing device. The received temporary update may be included within storage associated with the first client computing device. The received temporary update may ignore one or more preferences associated with the second user or second client computing device.

In some embodiments, a computer-readable storage medium for multi-user, at least partially concurrent, electronic circuit design is provided. The computer-readable storage medium may have stored thereon instructions that when executed by a machine result in one or more operations. Operations may include displaying, at a first client computing device associated with a first user, at least a portion of an electronic circuit design, wherein the electronic circuit design is accessible by multiple users in an at least partially concurrent manner. Operations may include processing a command at the first client computing device from the first user and receiving a temporary update from a server computing device, wherein the temporary update corresponds to a second user associated with a second client computing device. Operations may further include displaying, at the first client computing device, an operation corresponding to the received temporary update.

One or more of the following features may be included. In some embodiments, the temporary update may include one or more temporary objects and wherein the one or more temporary objects includes a partial representation of a database object. Operations may further include transmitting, from the first client computing device, a temporary update from the first client computing device to the server computing device. In some embodiments, the one or more temporary objects may correspond to real objects in an internal memory model and wherein the internal memory model may include a memory copy of the electronic circuit design that is accessible by both the first client computing device and the server computing device. The temporary update may include a plurality of temporary updates received in real-time, in the order in which they are received at the server computing device. The received temporary update may be included within storage associated with the first client computing device. The received temporary update may ignore one or more preferences associated with the second user or second client computing device.

In one or more embodiments of the present disclosure, a system for multi-user, at least partially concurrent, electronic circuit design is provided. The system may include at least one processor configured to display, at a first client computing device associated with a first user, at least a portion of an electronic circuit design. The electronic circuit design may be accessible by multiple users in an at least partially concurrent manner, wherein the first client computing device is configured to process a command from the first user. The first client computing device may be configured to receive a temporary update from a server computing device, wherein the temporary update corresponds to a second user associated with a second client computing device. The first client computing device may be configured to display an operation corresponding to the received temporary update.

One or more of the following features may be included. In some embodiments, the temporary update may include one or more temporary objects and wherein the one or more temporary objects includes a partial representation of a database object. The first client computing device may be configured to transmit a temporary update from the first client computing device to the server computing device. The one or more temporary objects may correspond to real objects in an internal memory model. The internal memory model may include a memory copy of the electronic circuit design that may be accessible by both the first client computing device and the server computing device. The temporary update may include a plurality of temporary updates received in real-time, in the order in which they are received at the server computing device. The received temporary update may be included within storage associated with the first client computing device.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIG. 33 is a schematic depicting aspects of the concurrent design process in accordance with an embodiment of the present disclosure.

DETAILED DESCRIPTION

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

Embodiments of the concurrent design process described herein may utilize one or more electronic design automation techniques and/or tools such as those available from the Assignee of the subject application. Embodiments of concurrent design process may provide a multi-user environment that may allow for the creation of a layout of an electronic circuit design such as a printed circuit board ("PCB"). Accordingly, multiple users may be able to simultaneously work on a PCB/Package Design using the same commands and methods as if working in single user mode. Updates from other users may be continuously integrated asynchronously into the memory models and server managed database. In some embodiments, the concurrent design process discussed herein may include multiple versions of the same application running simultaneously on multiple computing devices and utilizing a common database as is discussed in further detail hereinbelow.

Figure 1:
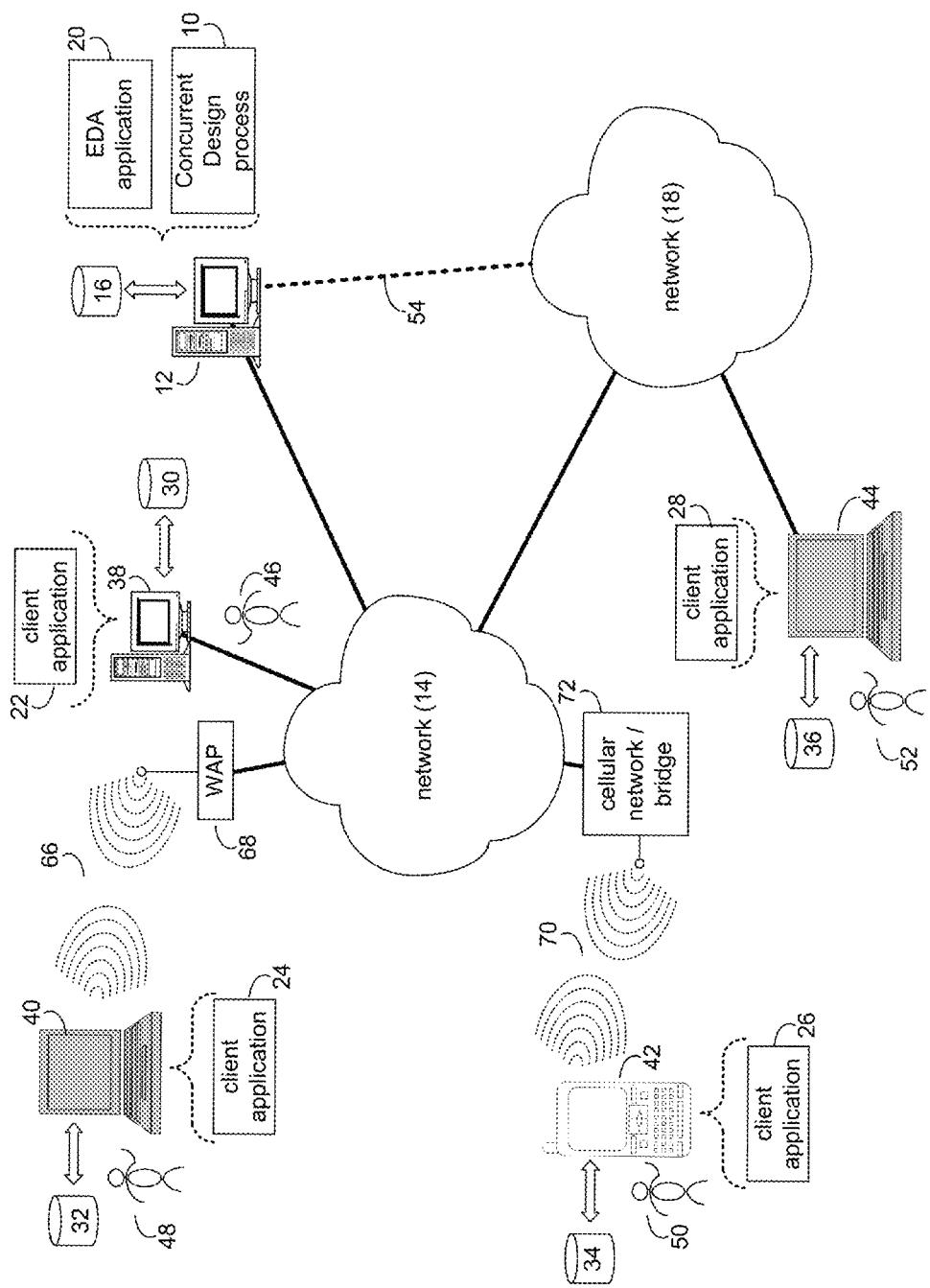
FIG. 1 is a system diagram depicting aspects of the concurrent design process in accordance with an embodiment of the present disclosure.

Referring to FIG. 1, there is shown concurrent design process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the concurrent design process may reside on and be executed, in whole or in part, by a client electronic device, such as a personal computer, notebook computer, personal digital assistant, or the like.

The instruction sets and subroutines of concurrent design process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for report generation. EDA application 20 may be referred to herein as a design tool.

Concurrent design process 10 may be a stand alone application, or may be an applet/application/script that may interact with and/or be executed within EDA application 20. In addition/as an alternative to being a server-side process, the concurrent design process may be a client-side process (not shown) that may reside on a client electronic device (described below) and may interact with an EDA client application (e.g., one or more of EDA client applications 22, 24, 26, 28). Further, the concurrent design process may be a hybrid server-side/client-side process that may interact with EDA application 20 and an EDA client application (e.g., one or more of client applications 22, 24, 26, 28). As such, the concurrent design process may reside, in whole, or in part, on server computer 12 and/or one or more client electronic devices. Accordingly, embodiments of concurrent design process 10 may include various techniques and configurations some of which may include, but are not limited to, one or more aspects of grid computing, peer-to-peer networking, and/or cloud-based system methodologies. Additionally and/or alternatively, concurrent design process 10 may incorporate one or more service oriented architectures, such as software as a service ("SaaS"), platform as a service ("PaaS"), and infrastructure as a service ("IaaS") models. Numerous other embodiments and configurations are also within the scope of the present disclosure.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize concurrent design process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.).

As used herein, a "Design", a "design database", or a "design file" may refer to aspects of an Electronic Design Automation (EDA) database of information, which may describe a Printed Circuit Board (PCB), an Integrated Circuit (IC), an IC Package, or any other suitable electronic device. In some embodiments, a design file may include geometries, attributes, properties, linkages as standalone items and they may also be included within complex hierarchies. The geometries may be made up of simple points to extremely complex polygon shapes including arcs and holes within the polygon. These complex polygon shapes may be compared against all objects in and around them to check for conflicts. The process of performing these checks is computationally intensive. In a multiuser environment, users must not be slowed down because of operations performed by other users. The design data and compute environment must be optimized together to provide instantaneous geometric updates to all users, while having the complex computations on the data being done only on the system that initiated the change and once completed, passed to the server for fast distribution to all other users.

Figure 2:
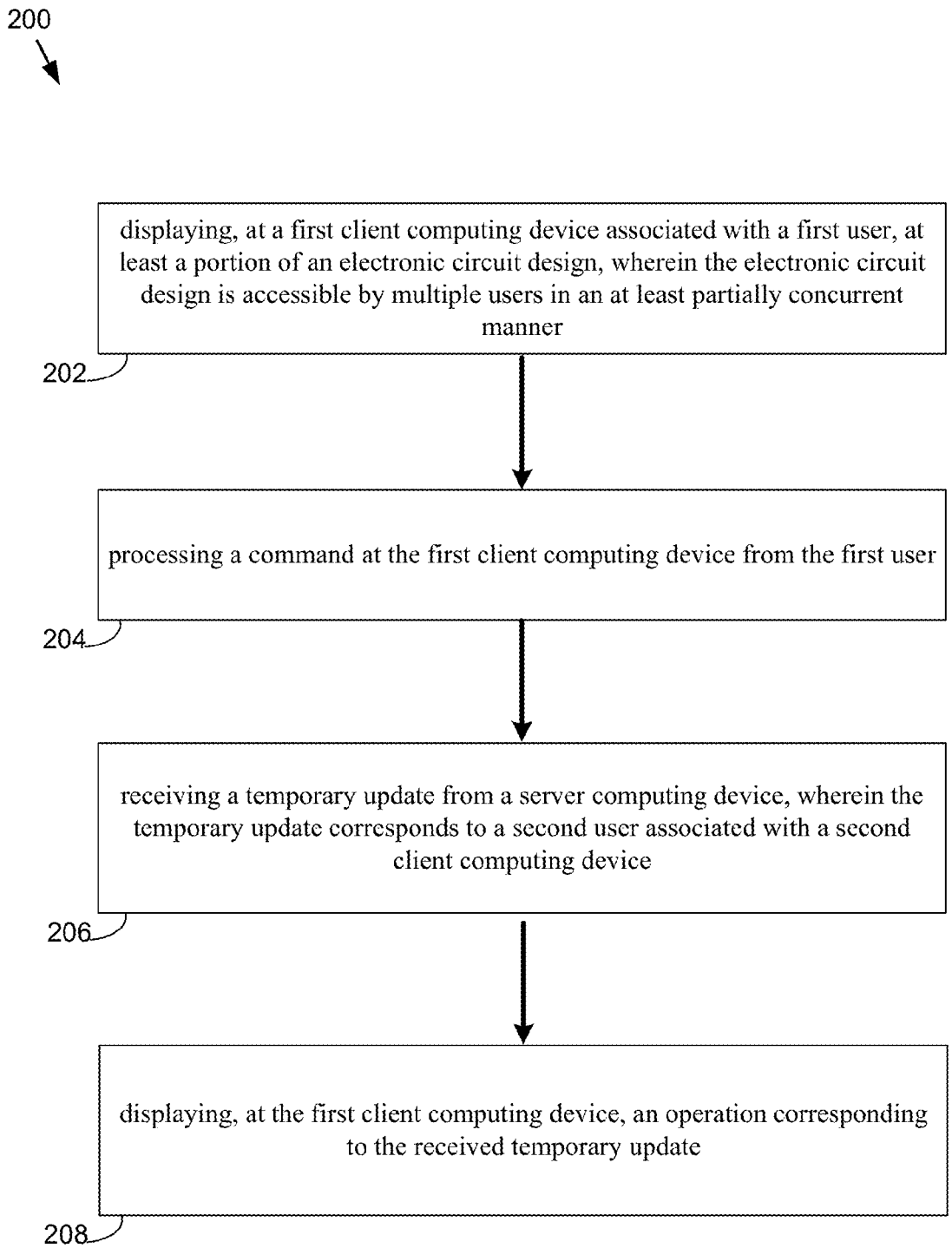
FIG. 2 is a flowchart depicting operations consistent with the concurrent design process of the present disclosure.

Referring also to FIG. 2, an embodiment showing a flowchart 200 depicting operations consistent with embodiments of concurrent design process 10 is provided. Concurrent design process 10 may be configured to allow for a multi-user, at least partially concurrent, electronic circuit design session. The phrase "at least partially concurrent" as used herein may indicate that multiple users may be operating on a design during a same time frame. In some embodiments, the process may include displaying (202), at a first client computing device associated with a first user, at least a portion of an electronic circuit design, wherein the electronic circuit design is accessible by multiple users in an at least partially concurrent manner. The process may further include processing (204) a command at the first client computing device from the first user. The process may also include receiving (206) a temporary update from a server computing device, wherein the temporary update corresponds to a second user associated with a second client computing device. The process may further include displaying (208), at the first client computing device, an operation corresponding to the received temporary update. Numerous other operations are also within the scope of the present disclosure.

Figure 3:
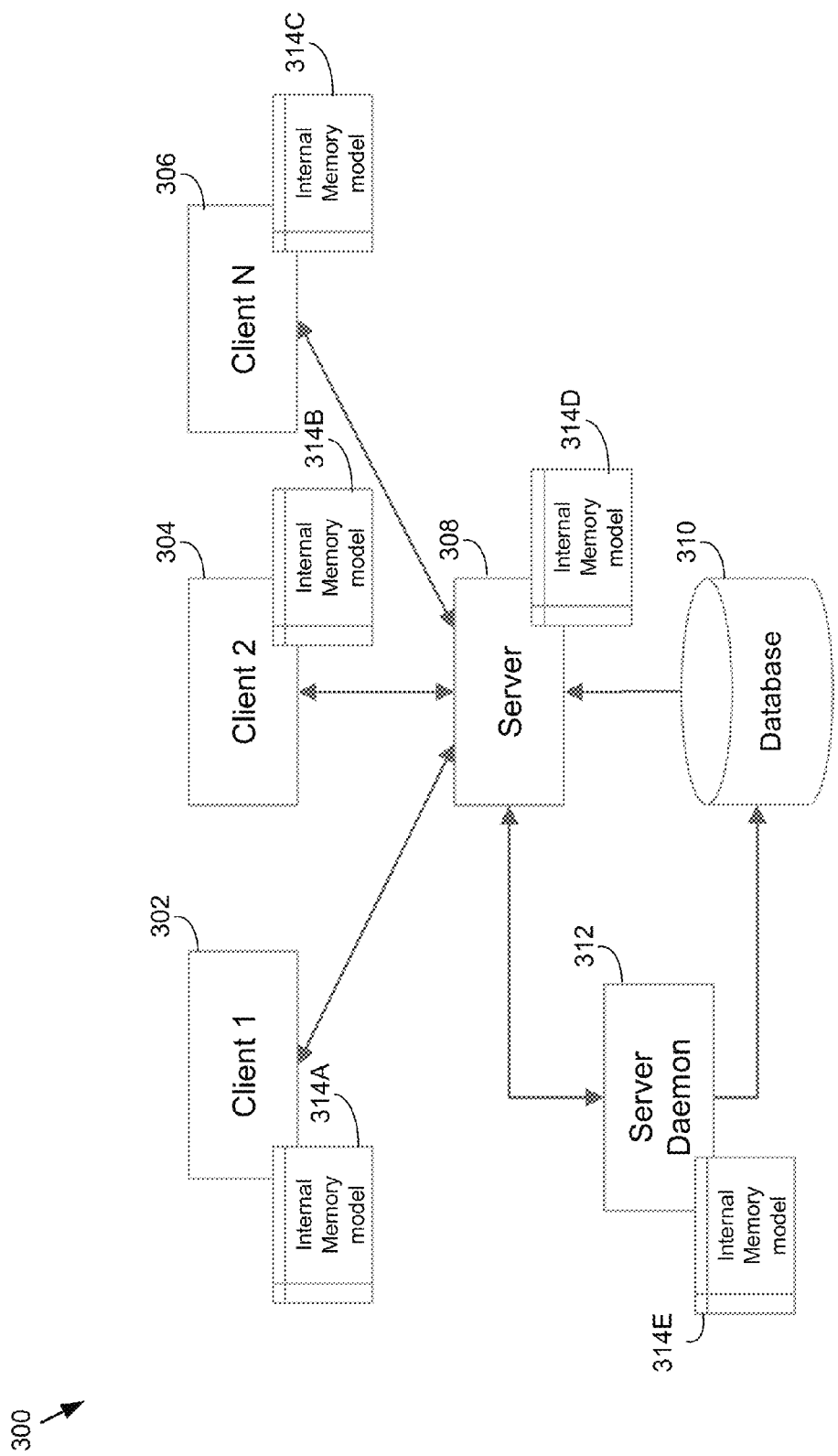
FIG. 3 is a schematic depicting aspects of the concurrent design process in accordance with an embodiment of the present disclosure.

Referring now to FIG. 3, an embodiment of concurrent design process 10 showing a multi-user design environment 300 is provided. Embodiments of concurrent design process 10 may provide a multi-user environment that may allow for the creation of a layout of an electronic circuit design such as a printed circuit board ("PCB"). Accordingly, multiple users may be able to simultaneously work on an electronic design (e.g. a PCB/Package design) using the same commands and methods as if working in single user mode. Updates from other users may be continuously integrated asynchronously into the memory models and server managed database as is discussed in further detail hereinbelow.

Figure 4:
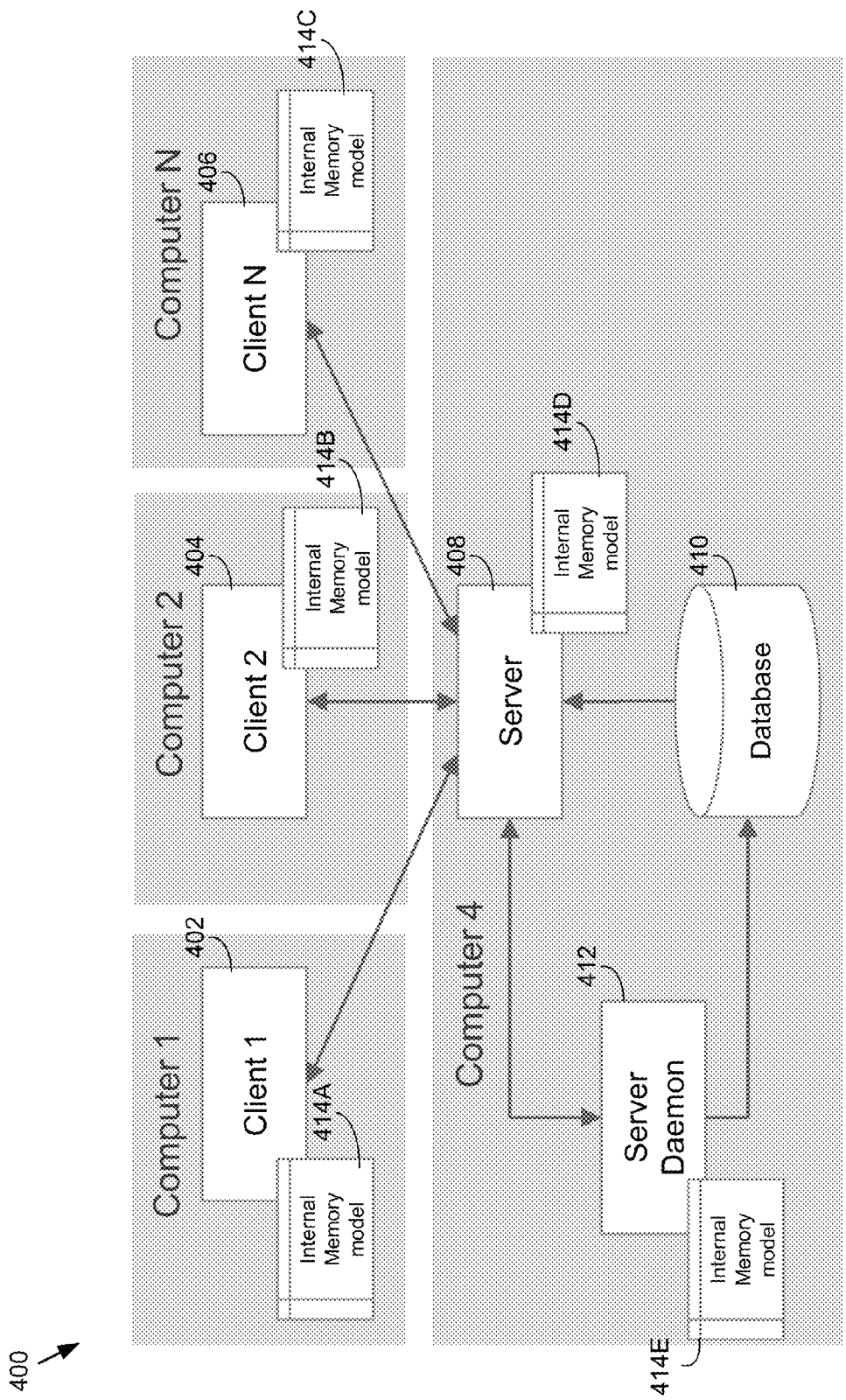
FIG. 4 is a schematic depicting aspects of the concurrent design process in accordance with an embodiment of the present disclosure.
Figure 5:
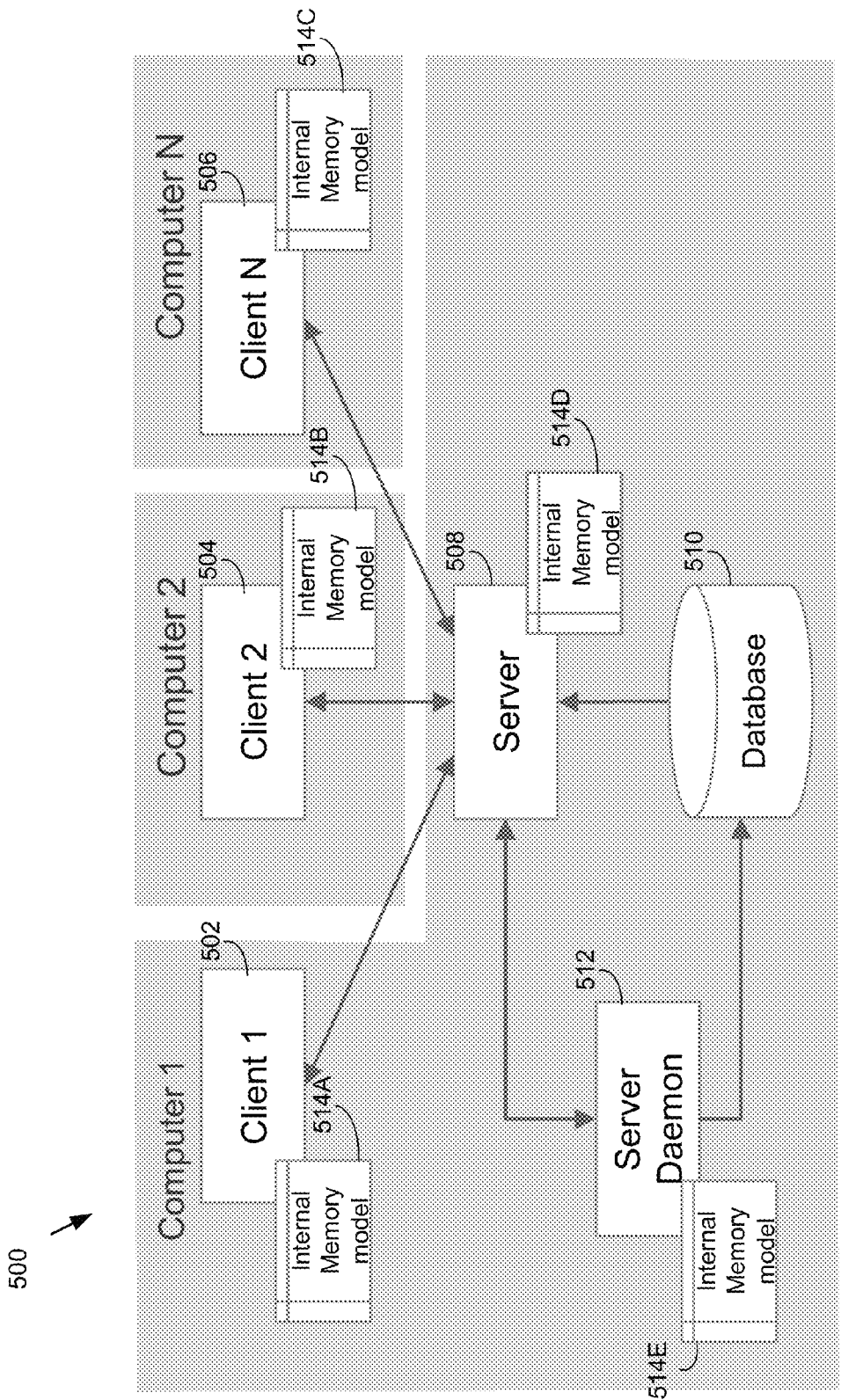
FIG. 5 is a schematic depicting aspects of the concurrent design process in accordance with an embodiment of the present disclosure.

As is shown in FIGS. 3-5 a number of client electronic devices 302, 304, 306, etc. may be configured to communicate with a server computing device 308 over a network. Although some of the Figures depict a limited number of client electronic devices it should be noted that embodiments of concurrent design process included herein are not limited to those configurations. Accordingly, any number of client electronic devices may be used without departing from the scope of the present disclosure. Server computing device 308 may also be in communication with database 310 and server daemon 312. Each of the computing devices may have an internal memory model ("IMM") associated therewith, for example, internal memory models 314A-E depicted in FIG. 3. In some embodiments, server computing device 308 may own design database 310 and server daemon may be configured to maintain data integrity, as well as to perform updating and saving of data.

In some embodiments, each of client computing devices 302, 304, 306, etc. may include a single instance of an electronic design application such as EDA application 20 shown in FIG. 1. Internal memory models 314A-E may each include a memory copy of the electronic design on which client electronic devices 302, 304, 306, etc. and server computing device 308 may operate. In some embodiments, the internal memory model may not correspond to an exact replica of the electronic design disk. Each IMM may include the parameters of the particular client computing device that it is associated with. As such, the design database 310 may not running locally on each of the corresponding client computing devices 302, 304, 306, etc. In some embodiments, the IMM of each client computing device may be identical. In the event of a disconnection a user may obtain the newest version of the database including the updates from each of the client computing devices as is discussed in further detail hereinbelow.

In operation, if an edit to the electronic design is made by one of the client computing devices 302, 304, 306, etc, it may immediately add the data to its corresponding IMM. Accordingly, as the client computing device receives user input that edit may be immediately displayed at the user's computing device. That particular client computing device may also transmit the data (which may not rely upon client specific parameter settings that may be stored on a client specific file on disk) to server computing device 308, which may add the edit to its own IMM (again, without relying upon client specific parameter settings) and then broadcast the change to the other active applications at each of the other client computing devices so that the change may be made to each of their respective IMMs as well. Accordingly, embodiments of concurrent design process 10 do not require changes to be synchronized through a server, which may be particularly beneficial when clients are located in different geographical regions as such a system would encounter latency issues. Instead, each client computing device is allowed to display changes immediately and, as such, each client does not need to wait for server computing device 308 to forward the proposed change back to the client computing device that initiated the change. Additionally and/or alternatively, server computing device 308 may reject the edit and send a rejection back to the originating client computing device in an asynchronous manner. In this way, the other client computing devices will never see the edit. Server computing device 308 may add the edit or data change to design database 310 if appropriate. In some embodiments, concurrent design process 10 may include one database that may be owned by server computing device 308.

Referring now to FIGS. 4-5, FIG. 4 depicts an embodiment where server computing device 408 is separate from the client computing devices 402, 404, and 406. FIG. 5 depicts a similar configuration, however, in this particular embodiment the server process may be associated with the same computer as one of the client computing devices (e.g. server computing device 508 and client computing device 502 may be part of the same computing device).

Figure 6:
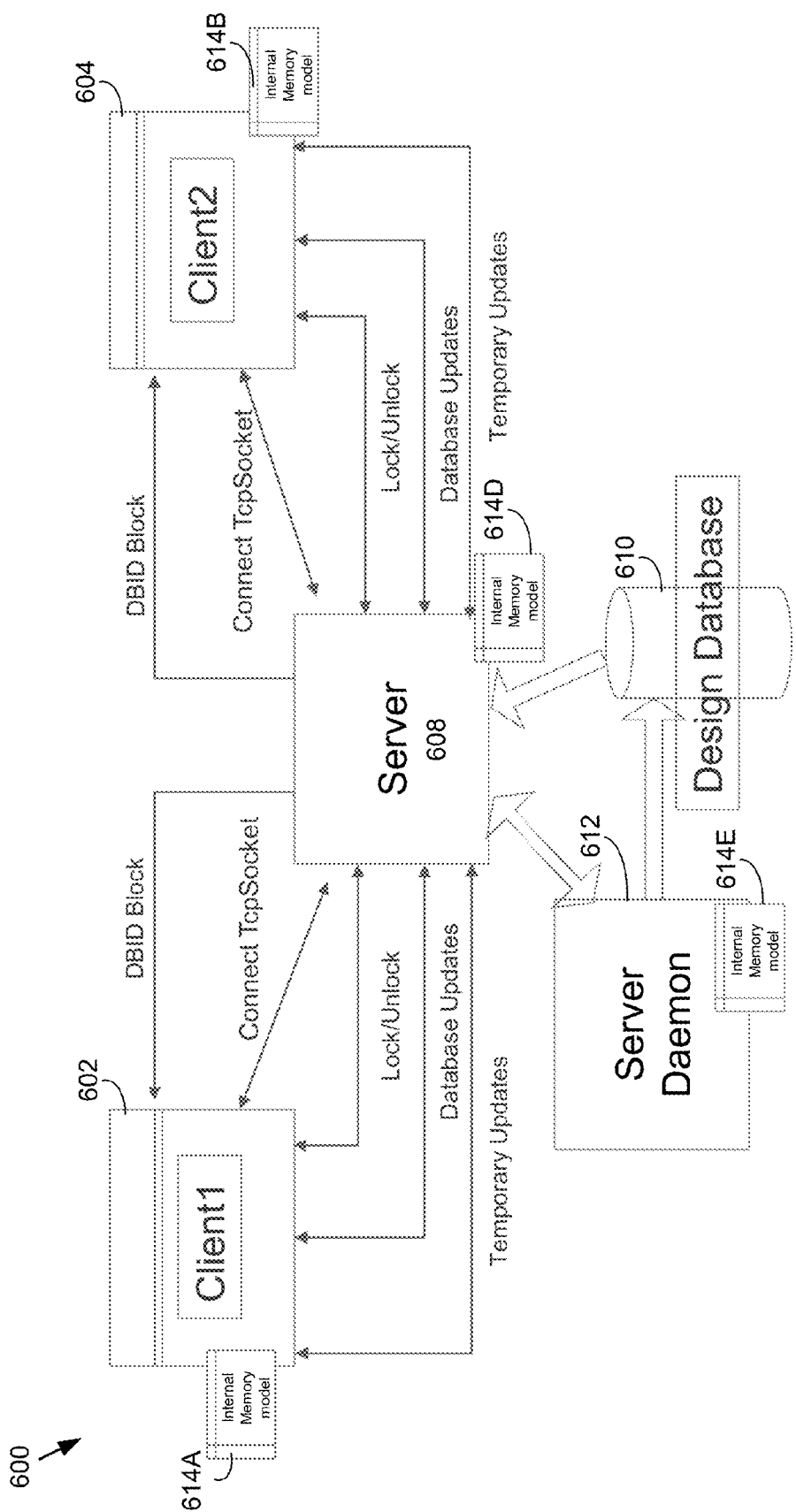
FIG. 6 is a schematic depicting aspects of the concurrent design process in accordance with an embodiment of the present disclosure.

Referring also to FIG. 6, in operation, one or more of client computing devices 602, 604, etc. may establish a connection with server computing device 608. Once the connection has been established client computing devices 602, 604, etc. may join the design session and acquire the necessary information from design database 610. As shown in the Figure, each client computing device 602, 604, etc. may be configured to lock and/or unlock objects associated with the electronic design. Additionally and/or alternatively, each client computing device 602, 604, etc. may be configured to send and receive database updates and to send and receive temporary database updates. Each of these concepts are described in further detail hereinbelow.

In some embodiments, the server computing devices described herein (e.g. server computing device 608) may operate as the owner of the physical design database 610. Although the discussion below is directed towards server computing device 608 the functionality may be performed by any of the server computing devices described herein. Server computing device 608 may be configured to receive one or more database updates from each client computing device 602, 604, etc. and may also dispatch updates to the client computing devices 602, 604, etc., as necessary.

It should be noted that the multi-user database updates described herein may be performed asynchronously. Accordingly, the user at each respective client computing device may not need to wait for server computing device 608 to respond when database updates are sent. In this way, each client computing device is always prepared to undo its changes if server computing device 608 later refuses prior updates. The synchronization of update transactions at the client level may therefore help to maintain the integrity of the database. Additionally and/or alternatively, concurrent design process 10 may provide transaction synchronization between user performed actions and server received data. As such, the teachings of the present disclosure may allow for real-time updates and visualization of other user's work (e.g., while in a command, idle, etc.).

In some embodiments, server computing device 608 may be configured to automatically save the database to a disk at timed and/or predetermined intervals using server daemon 612. Accordingly, server daemon 612 may be configured to preserve data integrity and perform any necessary saving of data without slowing down the server, thus avoiding any unnecessary data loss. Server daemon 612 may be configured to send database fixes to server computing device 608 that may then be dispatched to all client computing devices. In this way, server daemon 612 may be used to offload various functions that may have been previously performed at server computing device 608.

In some embodiments, server computing device 608 may also provide client computing device 602, 604, etc. with a unique database identification ("DBID") pool to avoid any unwanted collisions. Each DBID may correspond to a unique identifier for database objects, which may help to ensure object uniqueness across multiple clients. In this way, as each client computing device creates new objects these new objects may be assured of being assigned its own unique identifier via the DBID pool.

Server computing device 608 may be further configured to perform one or more locking or and/or unlocking operations associated with concurrent design process 10. For example, server computing device 608 may be configured to maintain and control object locks and release temporary locks as necessary. Server computing device 608 may also maintain and store each user's preferences and settings.

In some embodiments, each client computing device may establish a connection with server computing device 608 using a variety of techniques. For example, the user may access and open an electronic design (e.g. a PCB) that may already be in a multi-user session and connect to a known server computing device such as server computing device 608. Accordingly, each client computing device may be configured to initiate and/or launch a multi-user session using the currently opened board. Additionally and/or alternatively, concurrent design process 10 may provide a unique way to connect to a multi-user session by merely opening the regular database file on disk and automatically connecting to the machine where the server is currently running.

In some embodiments, a central communication class may control any communication with server computing device 608. Each client computing device may have the ability to join and leave design sessions as the user desires.

In some embodiments, each client computing device may be configured to transmit requests to lock and unlock objects to server computing device 608. As is shown in the Figures, each client computing device may also send and receive database updates. In some embodiments, communication with server computing device 608 may be performed through transmission control protocol ("TCP") sockets, where a TCP socket may generally refer to an endpoint of an inter-process communication. As such, concurrent design process 10 may allow for serialization of data to be passed between the client and server computing devices on socket. Accordingly, data may be read and transformed into the recipient's memory space. Database objects may be passed from each client computing device using streams and addresses resolved using a similar technique as if reading/writing on disk.

In some embodiments, concurrent design process 10 may provide the ability to undo or redo various operations. This functionality may be controlled outside the database (e.g. temporary database) using the update packets sent to server computing device 608 by each computing device. For example, the undo/redo option may utilize the previous update produced by the user within the multi-user environment of concurrent design process 10.

In some embodiments, each client computing device (e.g. 602, 604, etc.) may include multi-user capable commands that may be used to lock and unlock objects of interest that are associated with the electronic design. Embodiments of concurrent design process 10 may also include a user interface that may be configured to display any lock areas that have been reserved by the user. Additionally and/or alternatively, concurrent design process 10 may be configured to automatically lock and unlock objects of interest and/or children of objects of interest based on a command.

In some embodiments, a high level command loop may handle multi-user interaction for setting up the appropriate state. Transactions may be synchronized with current work and server received updates. In some embodiments, commands may be handled automatically by a default multi-user state and locking mechanism. Each client computing device may include a temporary display that may be used to display other user's work while in a command.

Figure 7:
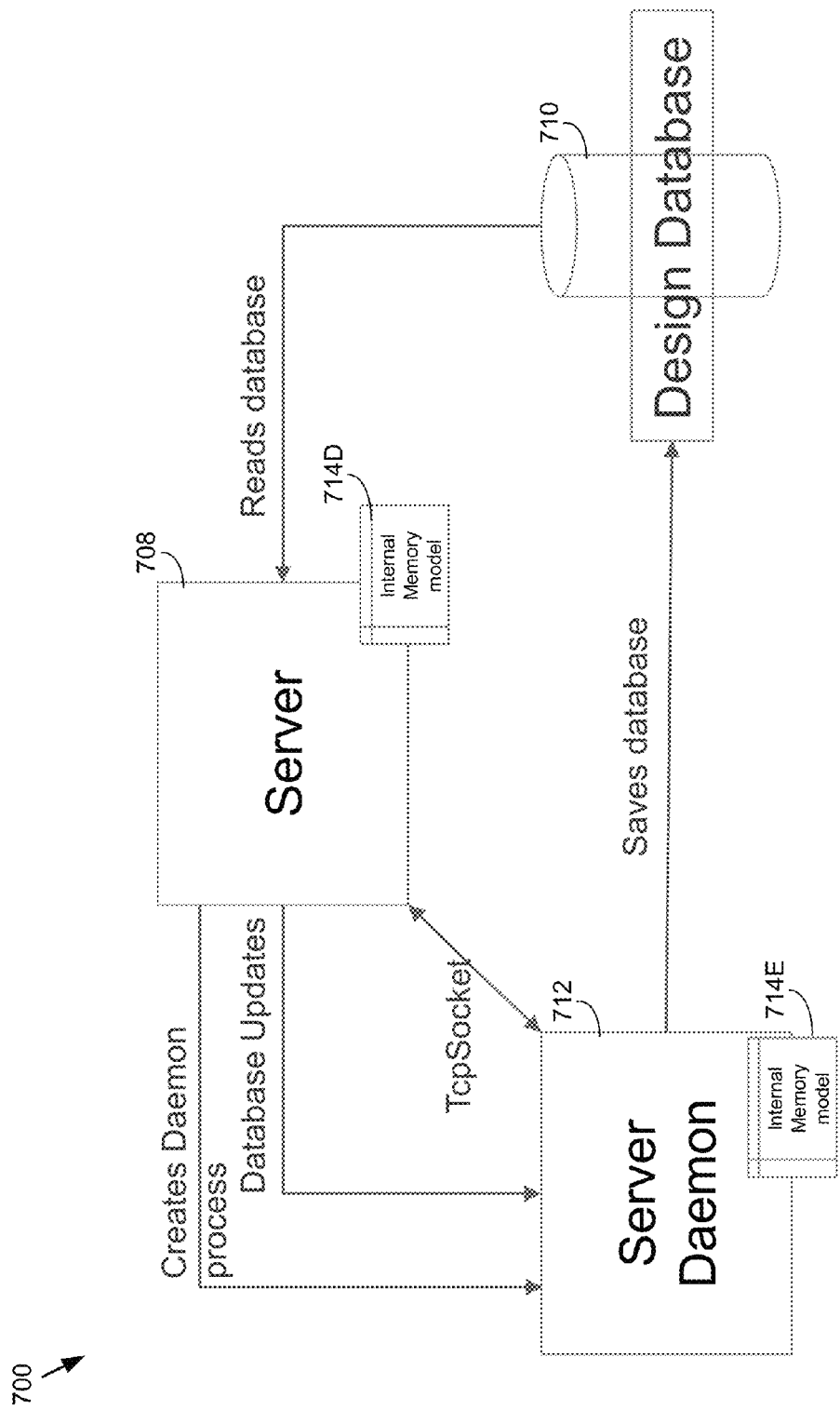
FIG. 7 is a schematic depicting aspects of the concurrent design process in accordance with an embodiment of the present disclosure.

Referring also to FIG. 7, an embodiment of concurrent design process 10 depicting an example server architecture 700 is provided. In operation, server computing device 708 may activate and launch server daemon 712. Server computing device 708 may be in communication with design database 710. Accordingly, server computing device 708 may open design database 710 from disk and generate internal memory model 714D. As updates are received from each of the client computing devices (not shown) these updates may be provided to server daemon 712.

In some embodiments, server daemon 712 may be configured to perform numerous operations. Some of these may include, but are not limited to, checking design integrity, updating shapes, performing design rule check ("DRC") operations, etc. Server daemon 712 may also send updated data to server computing device 708. Server daemon 712 may then save the electronic design back to disk at a pre-defined time interval or on demand, overwriting or creating backup depending on user preferences or settings.

Figure 8:
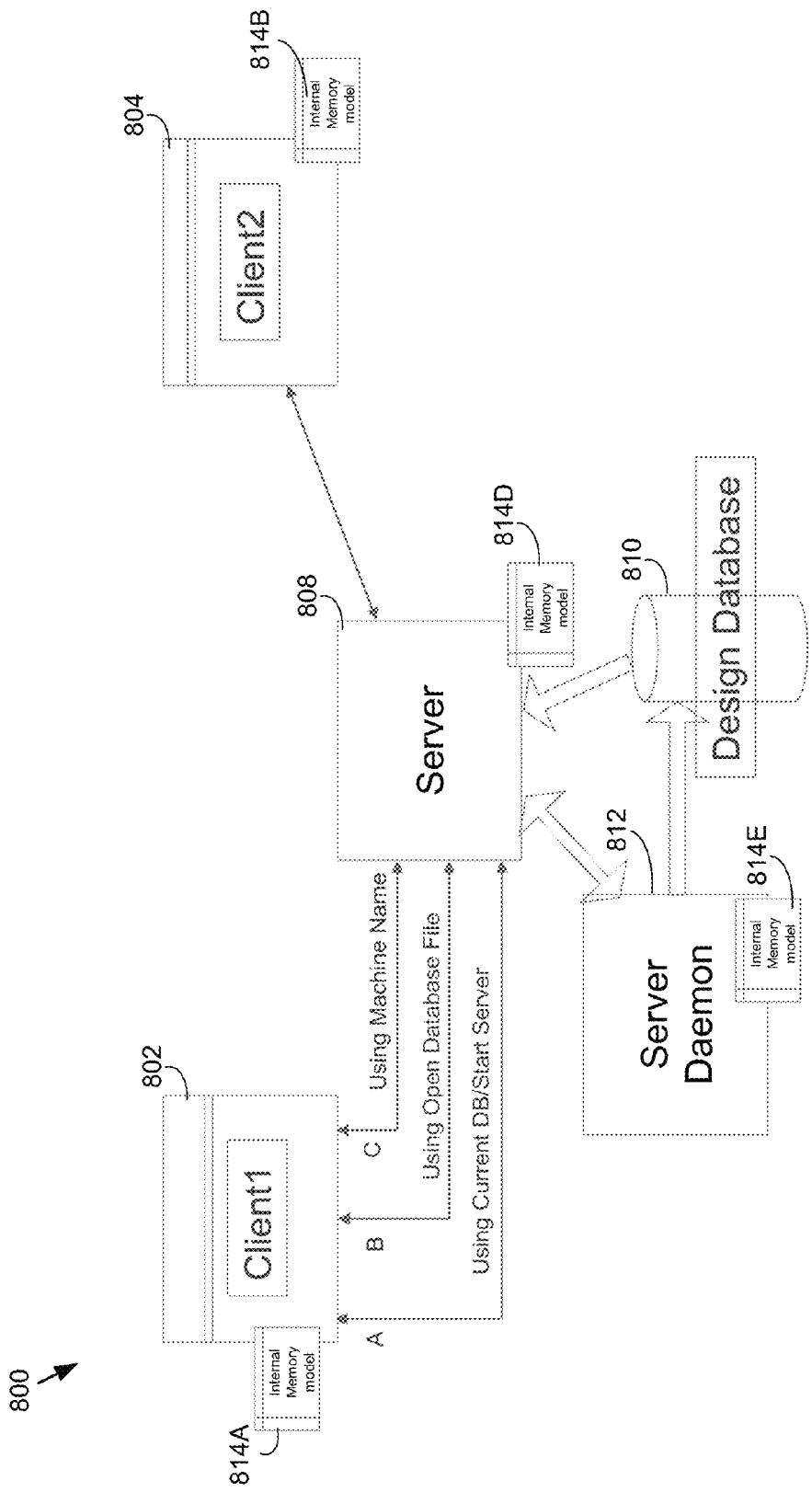
FIG. 8 is a schematic depicting aspects of the concurrent design process in accordance with an embodiment of the present disclosure.

Referring also to FIG. 8, an embodiment of concurrent design process 10 depicting various connection scenarios within architecture 800 is provided. As is shown in the Figure, client computing device 802 may establish a connection with server computing device 808 using any number of suitable techniques. For example, client computing device 802 may connect with server computing device 808 and initiate a multi-user session for others to join using the current design database 810. Additionally and/or alternatively, concurrent design process 10 may include opening a normal file on disk which is currently in a multi-user session. Other connection scenarios may include, but are not limited to using the server's address or machine name to establish a connection.

Figure 9:
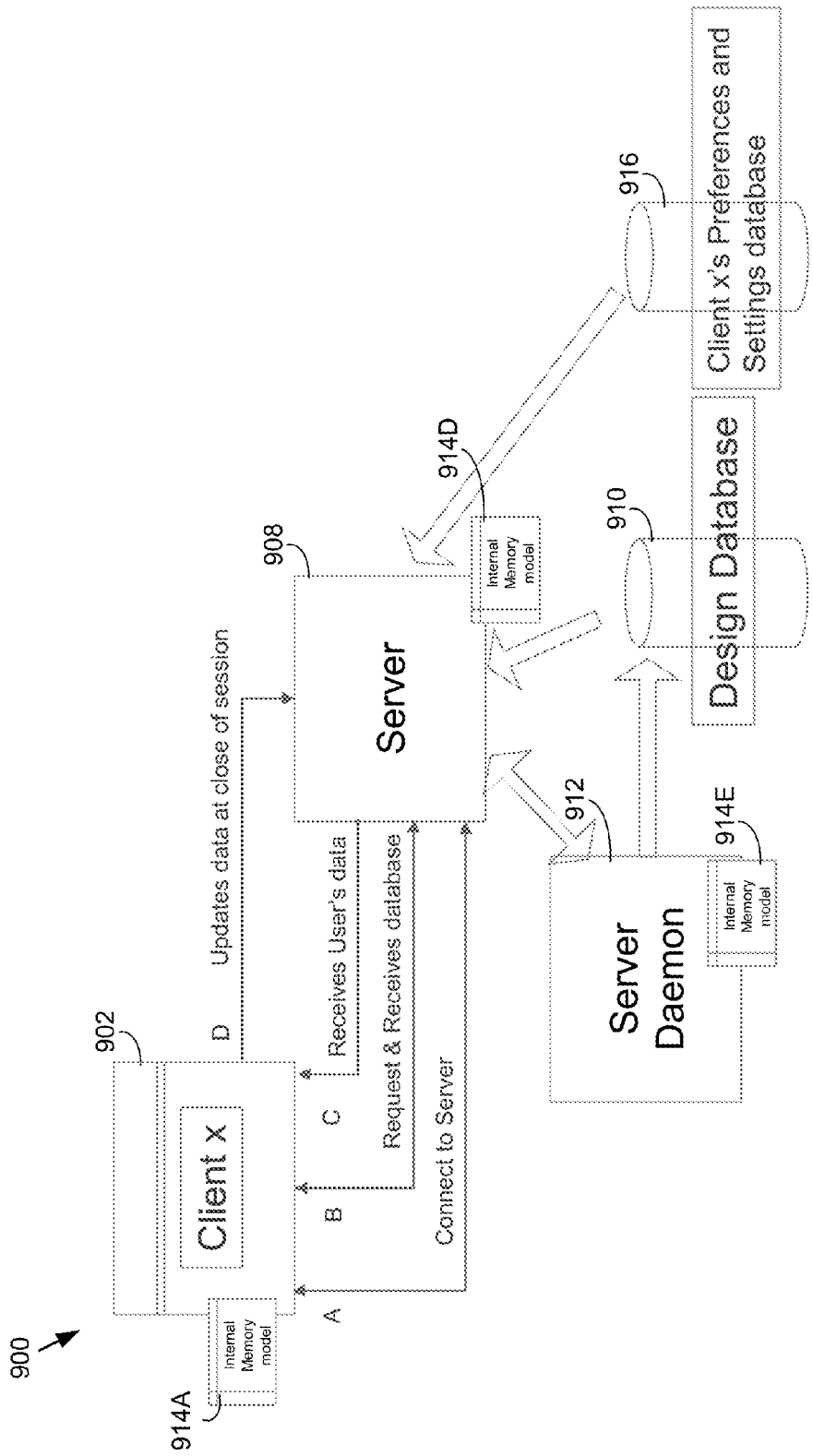
FIG. 9 is a schematic depicting aspects of the concurrent design process in accordance with an embodiment of the present disclosure.

Referring also to FIG. 9, an embodiment of concurrent design process 10 depicting the communication of various user preferences and settings within architecture 900 is provided. As is shown in the Figure, client computing device 902 may be configured to connect to a multi-user session via server computing device 908. Client computing device 902 may request and/or receive the design database 910. Additionally and/or alternatively, client computing device 902 may receive the user's specific preferences and settings, which may be stored at preferences and settings database 916, via server computing device 908. Concurrent design process 10 may allow for client computing device 902 to provide updates to the preferences and settings on server computing device 908 at the end of session. Accordingly, user's preferences and settings may be kept on server computing device 908 and received at connect time, thus allowing different client settings without requiring server switching.

Figure 10:
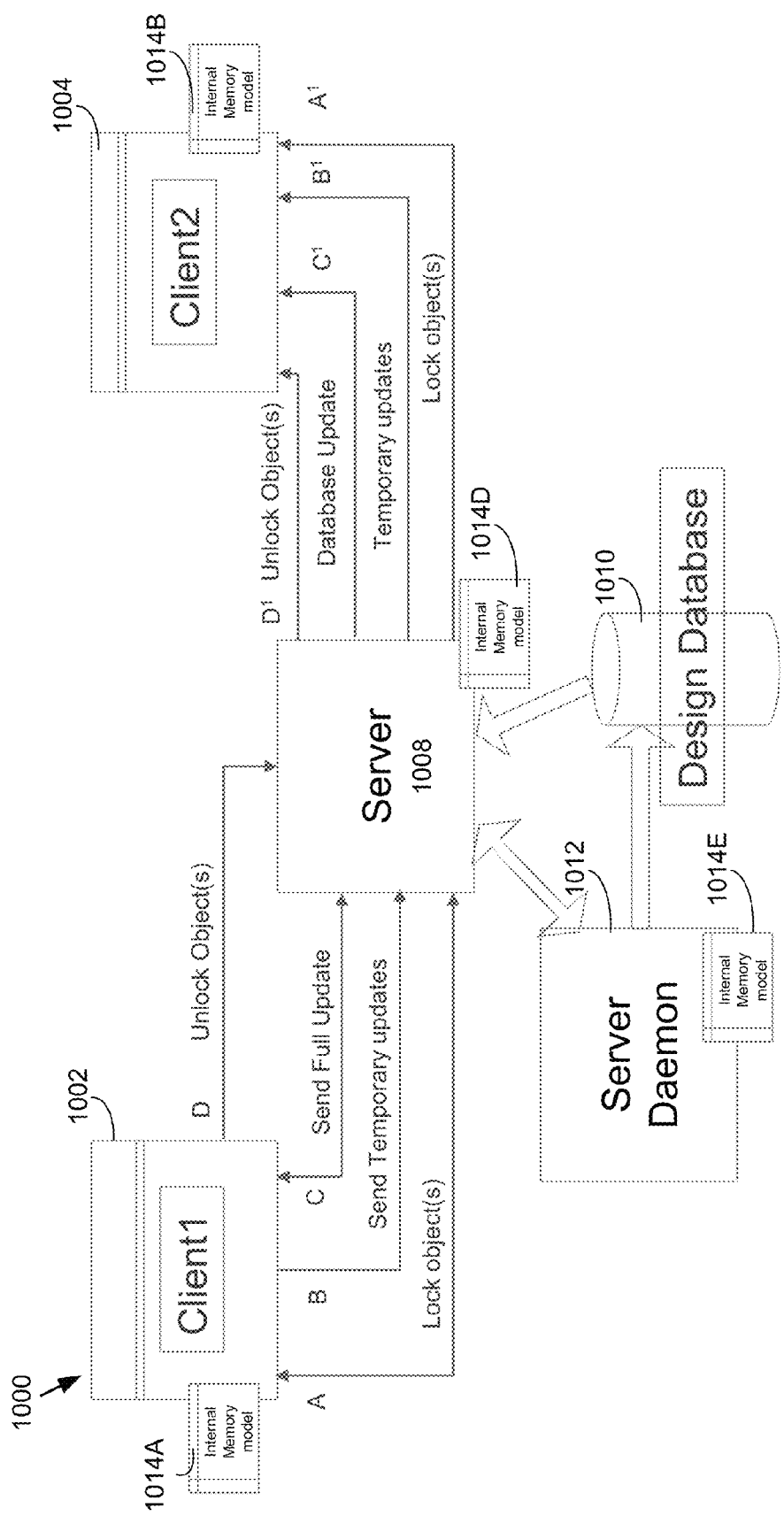
FIG. 10 is a schematic depicting aspects of the concurrent design process in accordance with an embodiment of the present disclosure.

Referring also to FIG. 10, an embodiment of concurrent design process 10 depicting database updates using commands within architecture 1000 is provided. In operation, the user of client computing device 1002 may initiate a command and may lock a particular object of interest associated with the electronic design. The user may begin working and client computing device 1002 may send temporary updates to server computing device 1008 as shown in FIG. 10. Once the work has been completed client computing device 1002 may send the full update of the design to server computing device 1008. Once the full update has been transmitted the object may be unlocked. A similar approach may be employed by client computing device 1004, and so on. It should be noted that concurrent design process 10 may allow for data to be transferred as objects, which may allow for fast and accurate integration into master database 1010 without requiring server computing device 1008 to perform ancillary processes.

Figure 11:
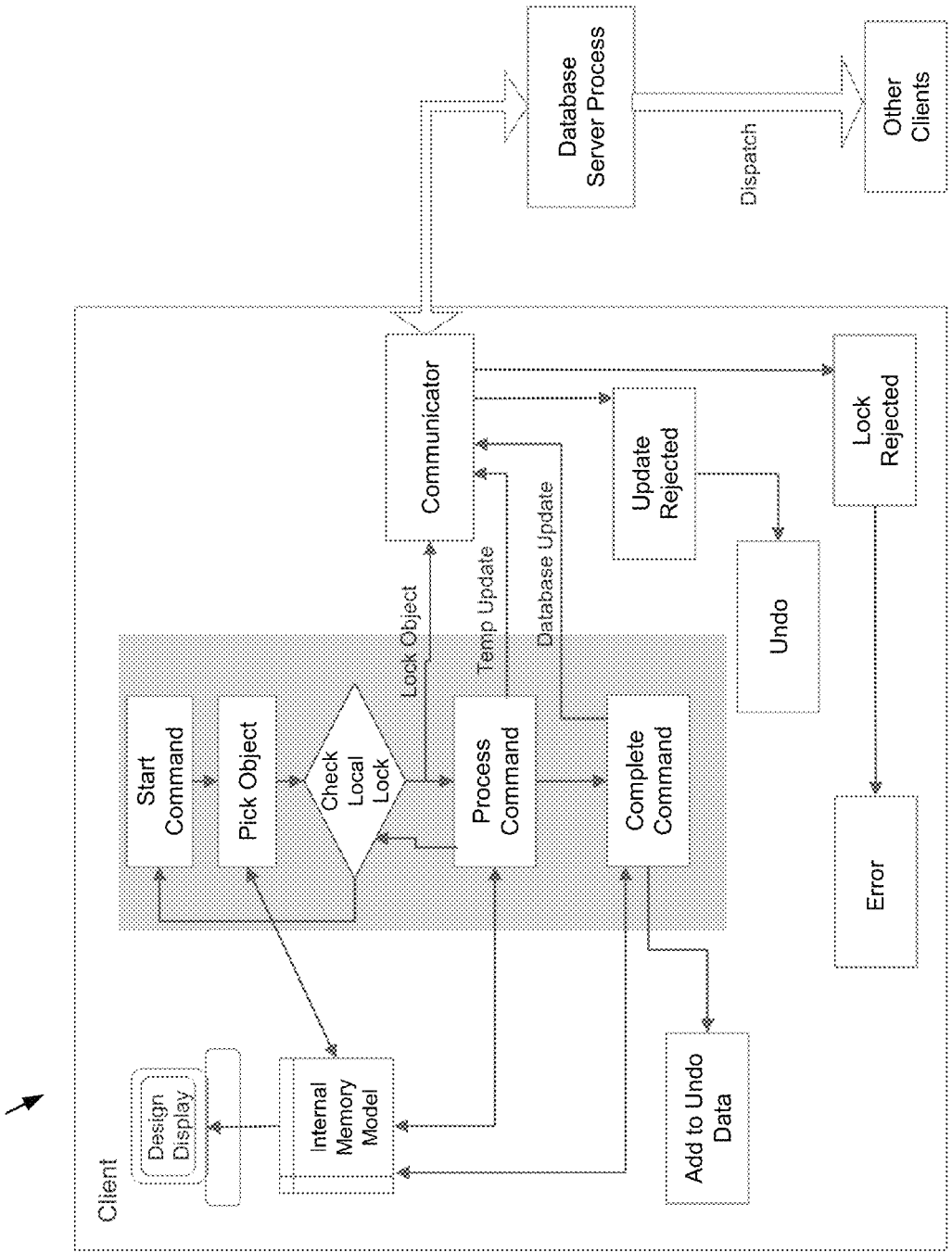
FIG. 11 is a schematic depicting aspects of the concurrent design process in accordance with an embodiment of the present disclosure.

Referring also to FIG. 11, an embodiment of concurrent design process 10 depicting an example of multi-user, concurrent operations 1100 are provided. This particular example describes one possible flow of data at one of the client computing devices.

Figure 12:
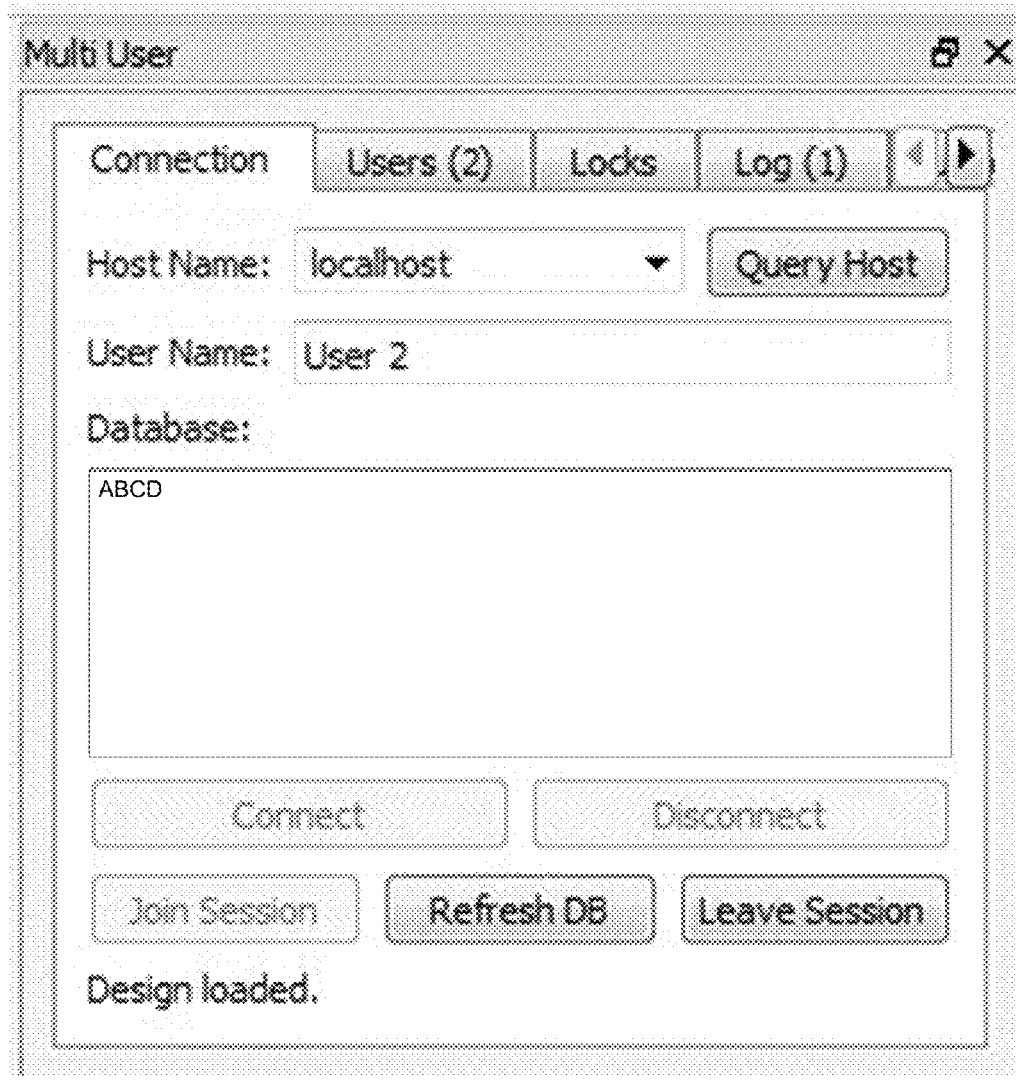
FIG. 12 is a schematic depicting aspects of the concurrent design process in accordance with an embodiment of the present disclosure.
Figure 13:
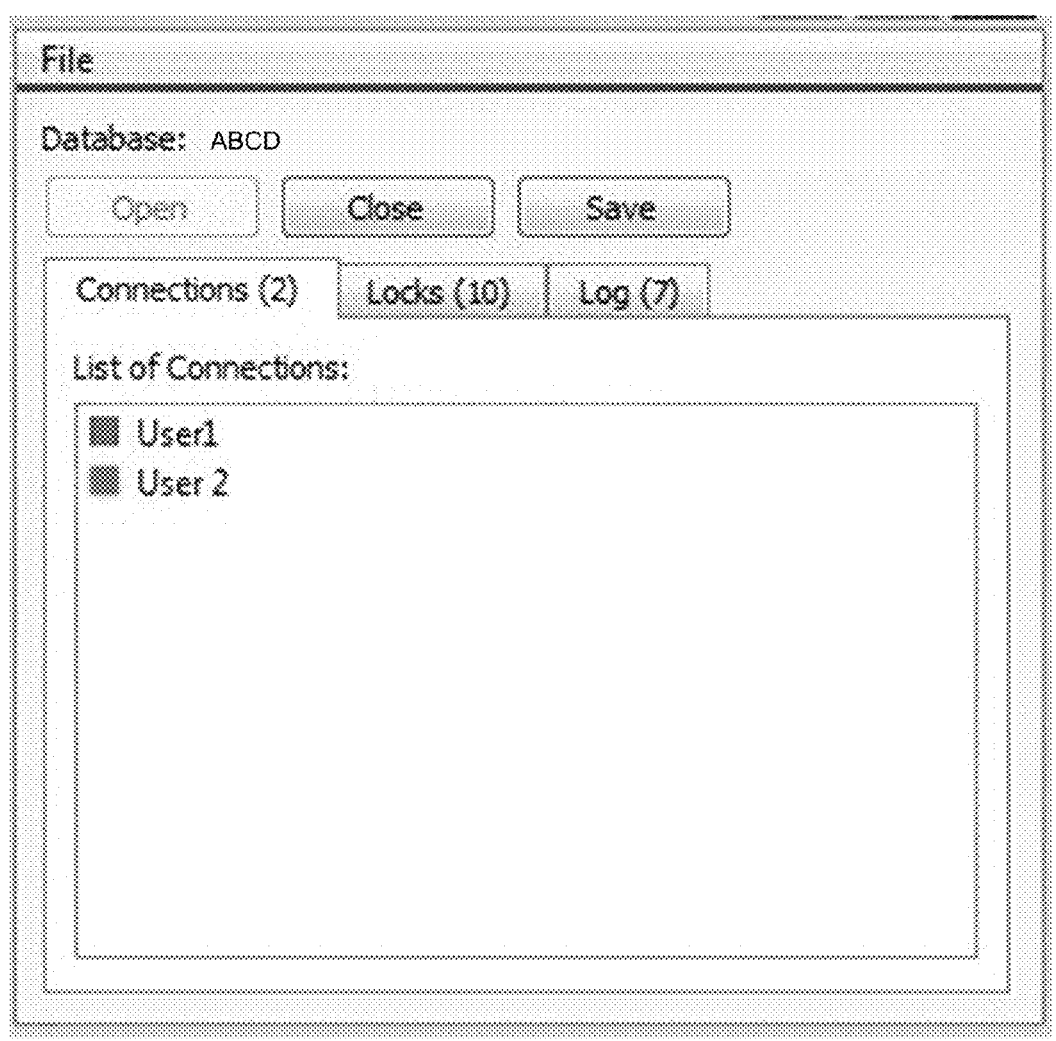
FIG. 13 is a schematic depicting aspects of the concurrent design process in accordance with an embodiment of the present disclosure.
Figure 14:
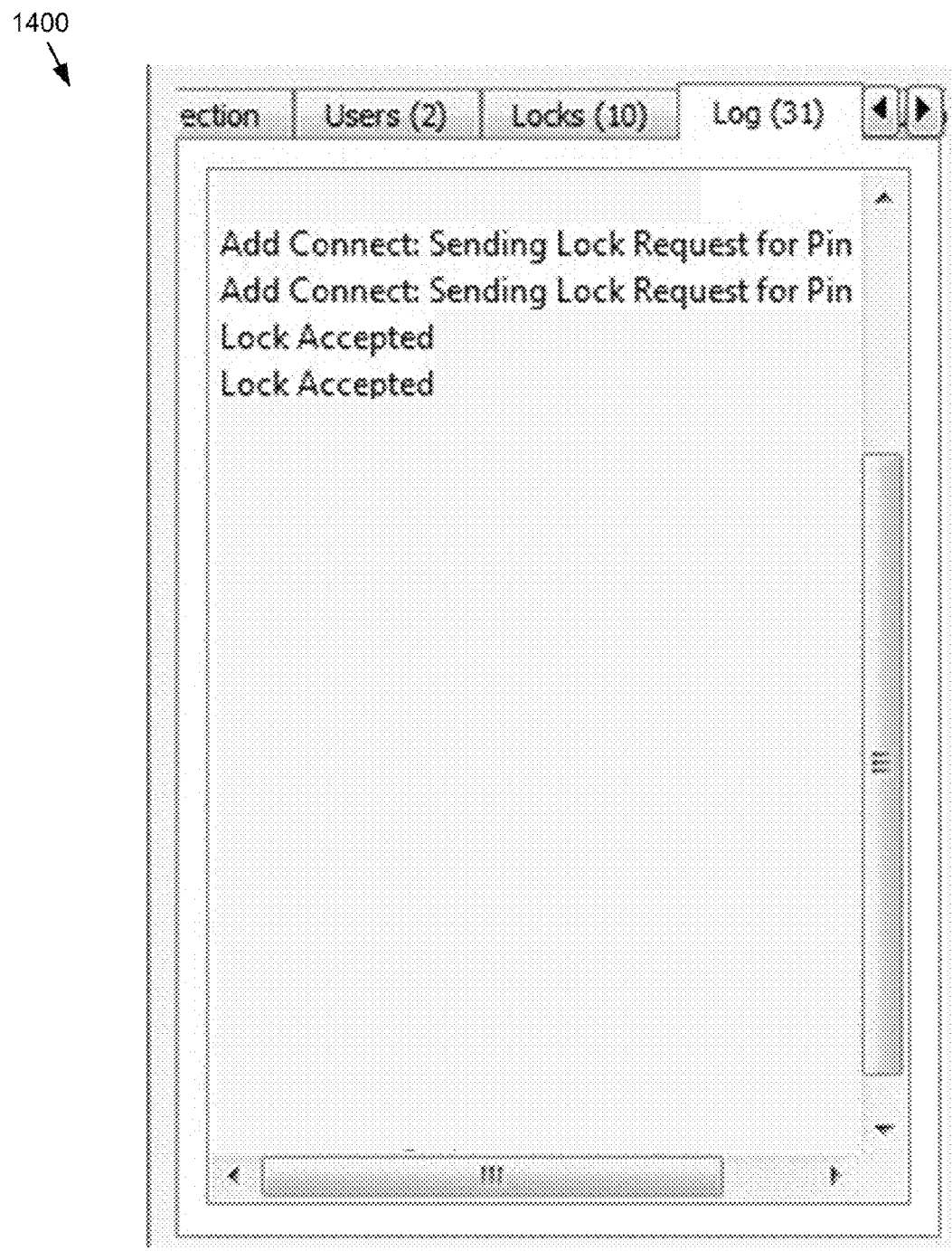
FIG. 14 is a schematic depicting aspects of the concurrent design process in accordance with an embodiment of the present disclosure.

Referring now to FIGS. 12-14, embodiments of concurrent design process 10 depicting various graphical user interfaces are provided. FIG. 12 depicts an example graphical user interface 1200 showing a connection interface to the server computing device as well as the available database. FIG. 13 depicts an example graphical user interface 1300 showing a server side connection and FIG. 14 depicts an example graphical user interface 1400 showing a log on a client side and how messages may be synchronized in accordance with concurrent design process 10.

Figure 15:
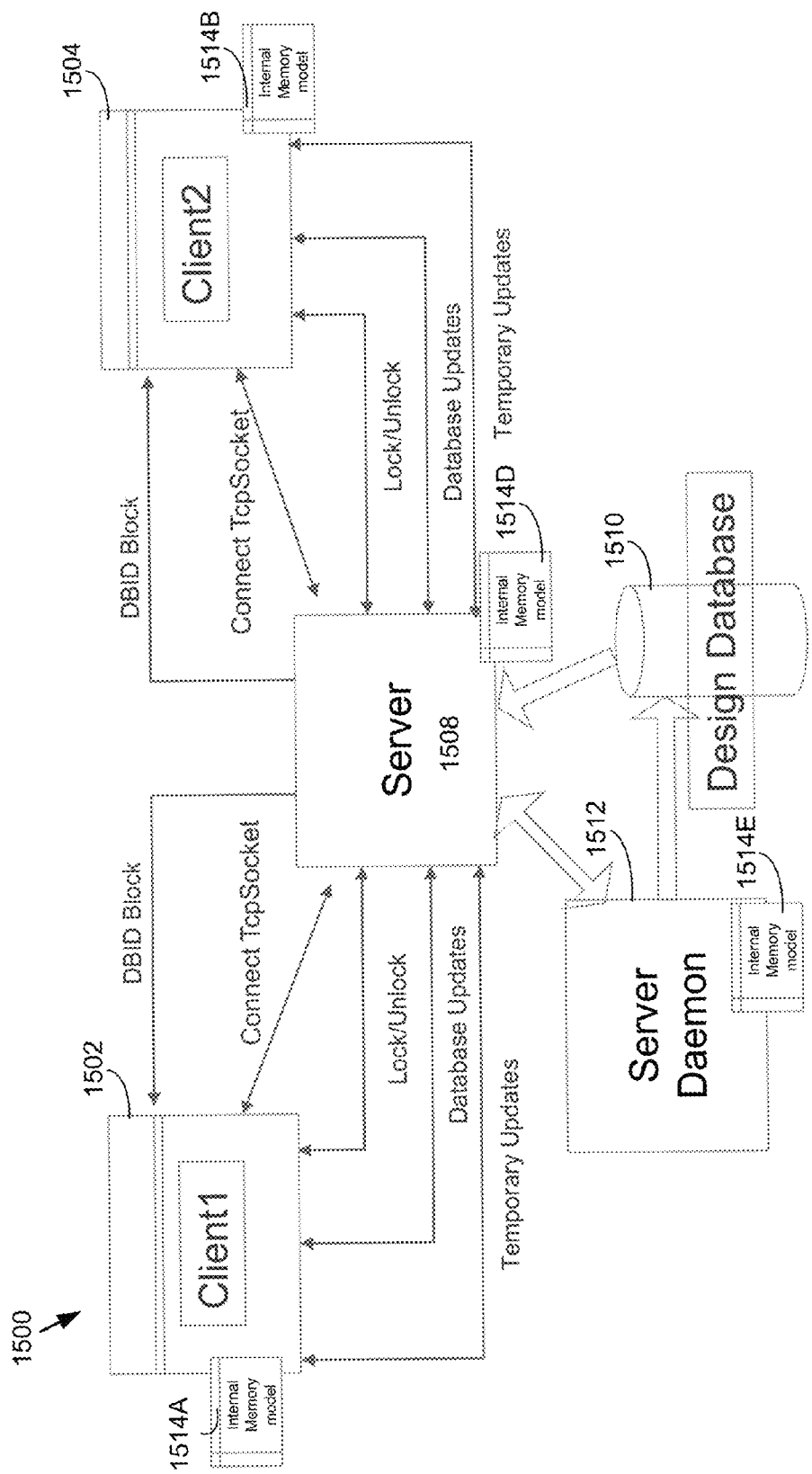
FIG. 15 is a schematic depicting aspects of the concurrent design process in accordance with an embodiment of the present disclosure.

In some embodiments, and referring now to FIG. 15, concurrent design process 10 may allow for the display of temporary data from other users in an electronic design. Accordingly, multiple users that may be working simultaneously on an electronic design (e.g., a PCB/Package Design, etc.) may be able to see what other users are working on and are about to do before they commit to a transaction. In operation, one or more of client computing devices 1502, 1504 may establish a connection with server computing device 1508 and may join a design session and acquire database 1510. As discussed above, each client computing device may be able to lock/unlock objects, send and receive database updates, and send and receive temporary database updates.

Figure 16:
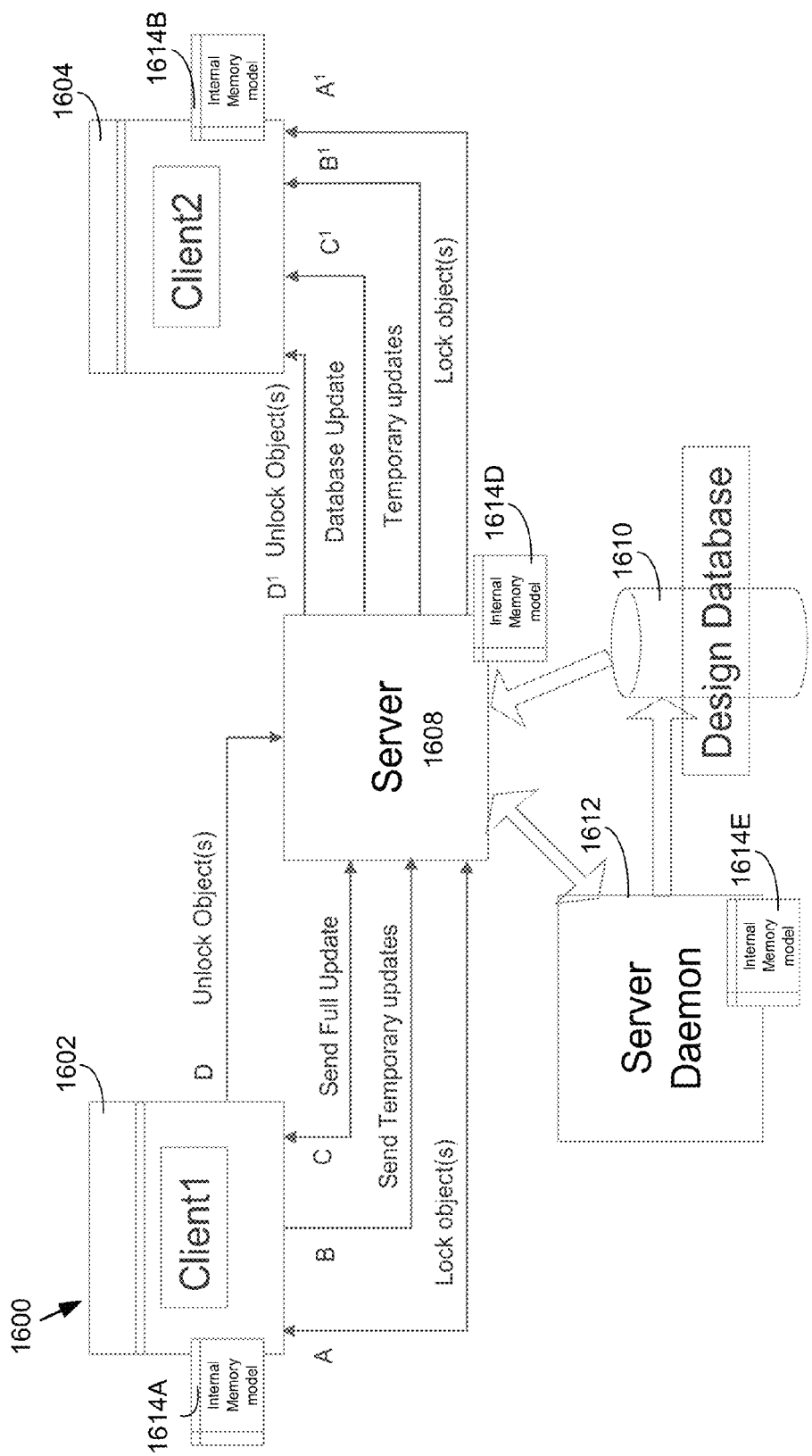
FIG. 16 is a schematic depicting aspects of the concurrent design process in accordance with an embodiment of the present disclosure.

Referring also to FIG. 16, an embodiment of concurrent design process depicting database updates using a command is provided. In operation, a user may initiate a command and lock object(s) of interest. The user may then begin working and temporary updates may be transmitted from client computing device 1602 to server computing device 1608. Once the user has completed his/her work the full update may be transmitted to server computing device 1608 at which point the object(s) may be unlocked.

Figure 17:
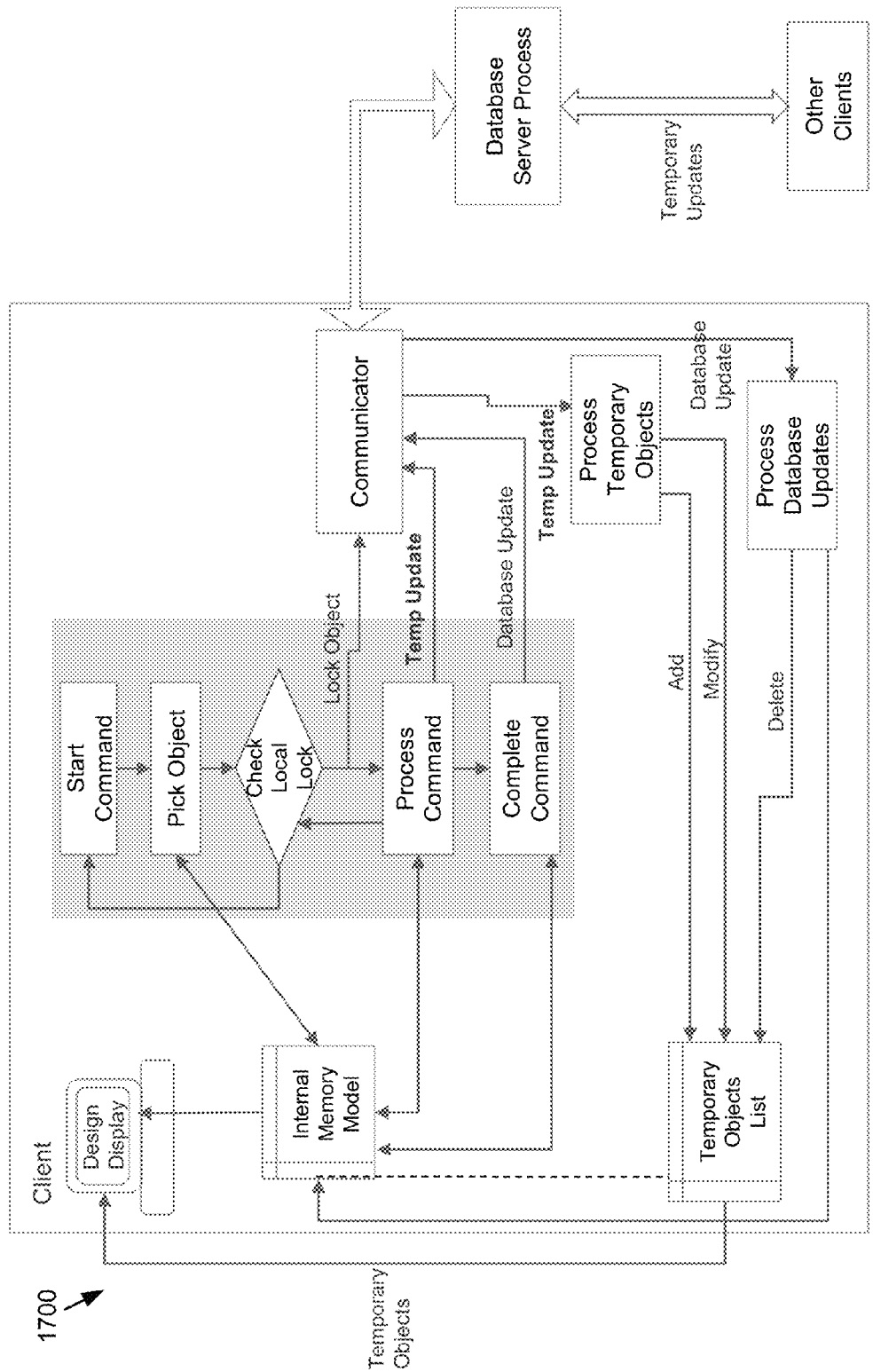
FIG. 17 is a schematic depicting aspects of the concurrent design process in accordance with an embodiment of the present disclosure.

Referring also to FIG. 17, an embodiment of concurrent design process 10 describing one example depicting a process for displaying temporary data is provided. In operation, a user associated with one of the client computing devices may start a command and select an object. Concurrent design process 10 may check for locks and then send a lock request to the server computing device. During command processing any temporary updates may be transmitted to the server computing device. Once the command has completed, concurrent design process 10 may transmit the database update to the server computing device. At any time during or outside a command, the client computing device may receive temporary updates from the server computing device. The temporary objects may be processed and new objects may be added to the temporary objects list. In some embodiments, the temporary objects may refer to objects from the internal memory model. Concurrent design process 10 may also modify temporary objects and receive database updates from the server computing device. Additionally and/or alternatively, concurrent design process 10 may integrate the update to the internal memory model. The temporary objects for that user may then be deleted in the temporary objects list.

As used here, the phrase "temporary object" may refer to partially completed representations of a real database object. In some embodiments, temporary objects may also refer/connect to real objects in the internal memory model. Concurrent design process 10 may involve the serialization of temporary data using the same, or a similar mechanism, as full database updates. In some embodiments, temporary data may be read and transformed into the recipient's memory space and the temporary update may not utilize the originating user's preferences and settings.

Accordingly, in some embodiments, concurrent design process 10 may allow for real-time update/visualization of other user's work while in a command or idle. As such, temporary work from other users, and their respective client computing devices, may be dispatched to other users for display purposes.

Figure 18:
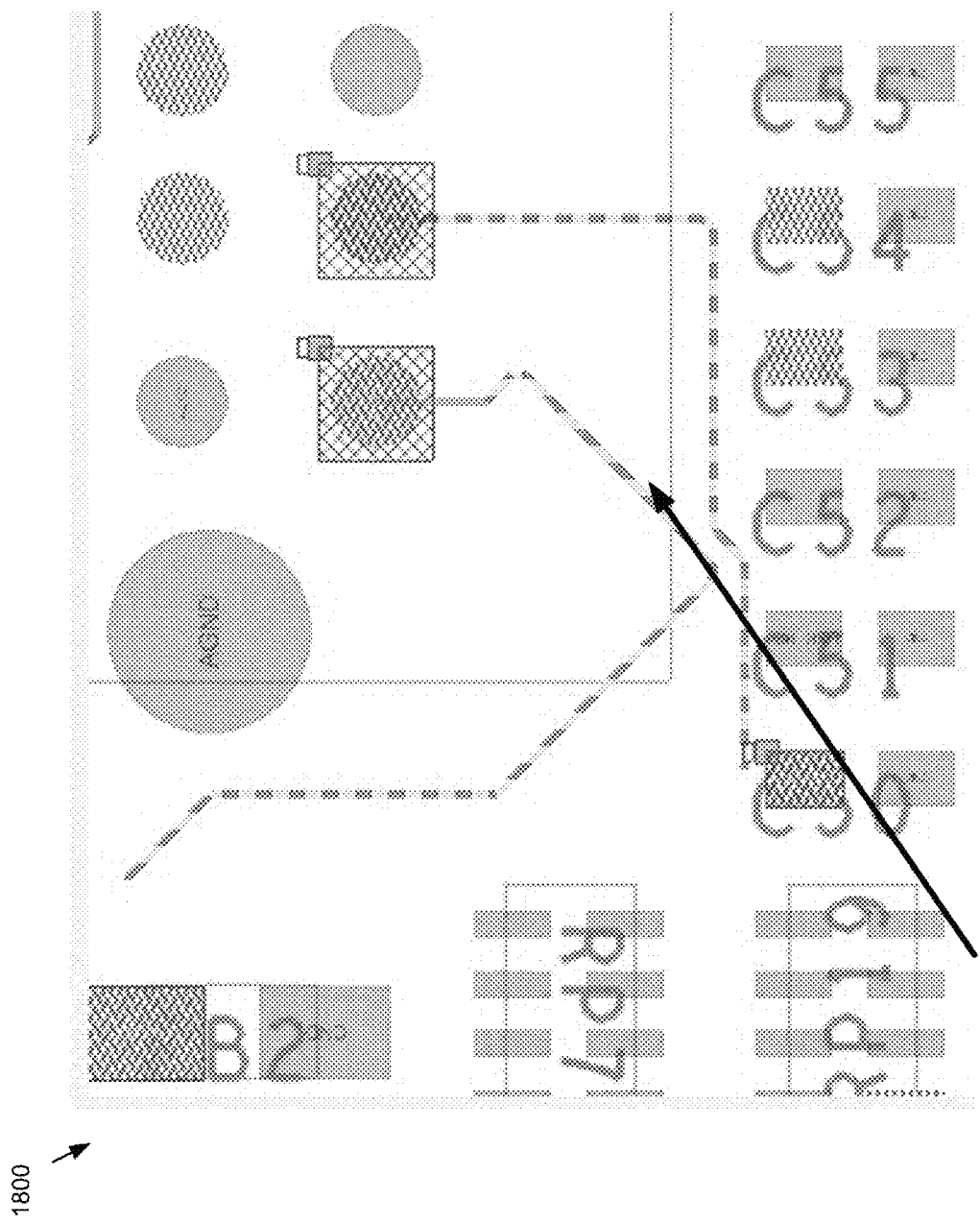
FIG. 18 is a schematic depicting aspects of the concurrent design process in accordance with an embodiment of the present disclosure.
Figure 19:
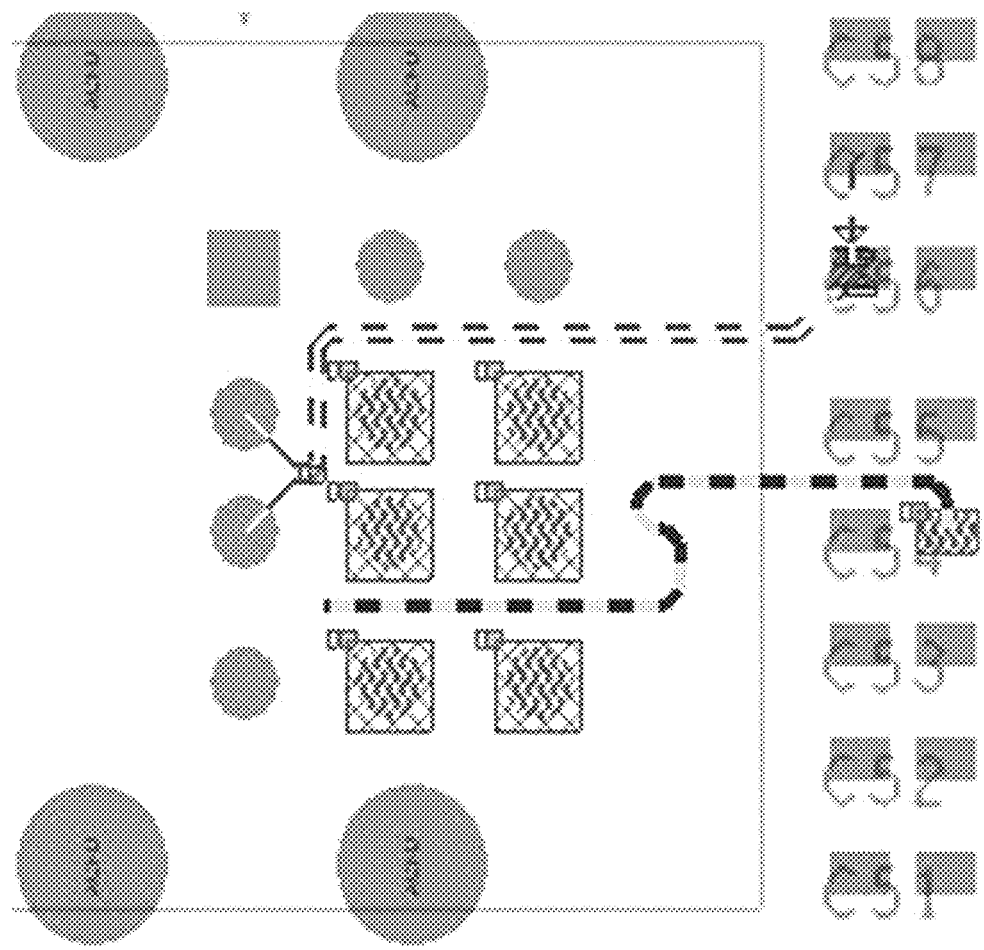
FIG. 19 is a schematic depicting aspects of the concurrent design process in accordance with an embodiment of the present disclosure.
Figure 20:
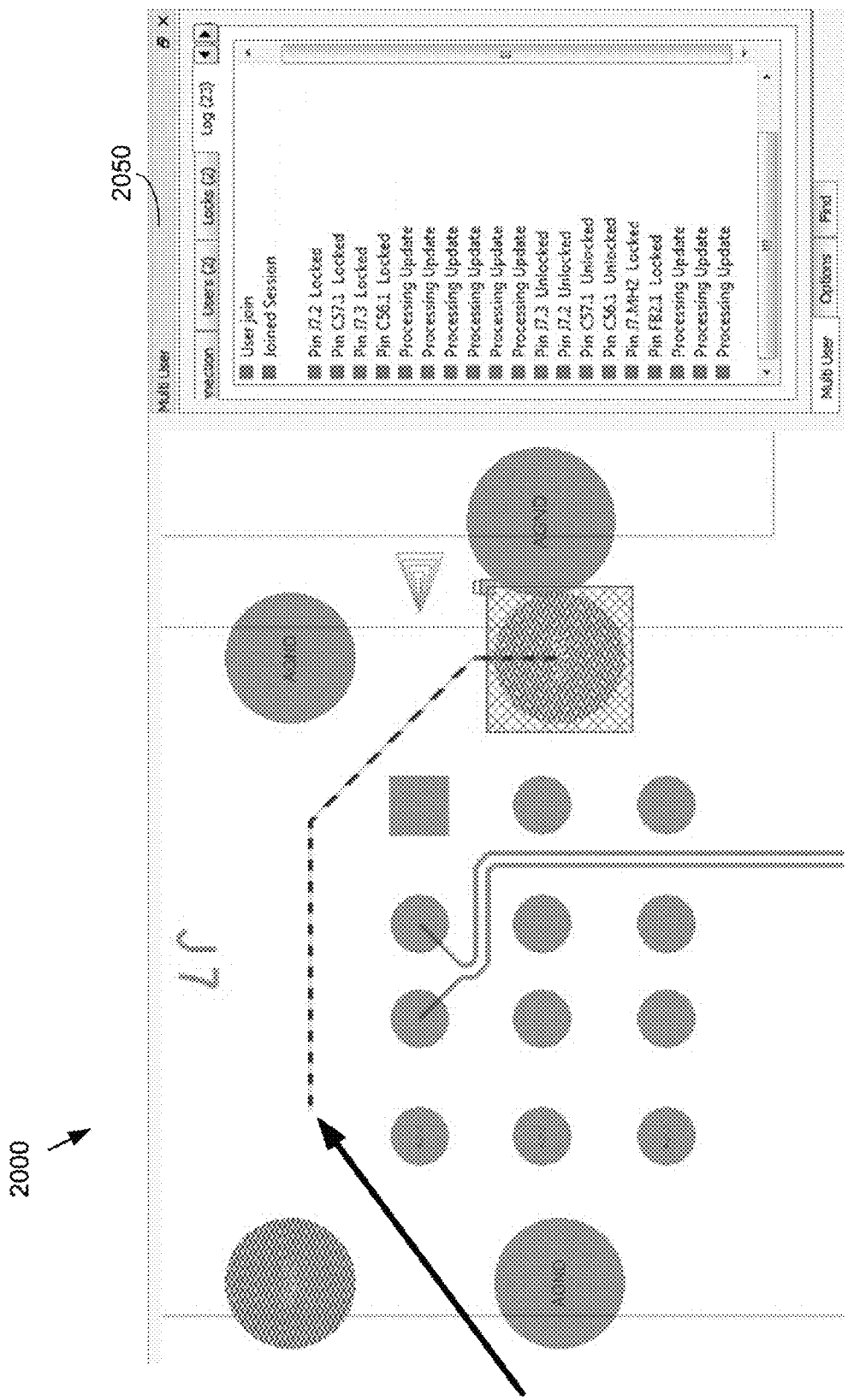
FIG. 20 is a schematic depicting aspects of the concurrent design process in accordance with an embodiment of the present disclosure.

Referring also to FIGS. 18-20, embodiments of graphical user interfaces consistent with concurrent design process 10 are shown. FIG. 18 shows an interface 1800 where a user is in the process of routing, as depicted by the arrow. FIG. 19 shows an interface 1900 where a user is routing through permanent locks of other users, which may be permitted using embodiments of concurrent design process 10. For example, a user may navigate through pins that may have been locked by another user at another client computing device. In some embodiments, a lock may be manually drawn and may also allow other users to traverse through the manually locked area.

FIG. 20 shows an interface 2000 where a user is in the process of routing a single pin as highlighted by the arrow. Interface 2000 further includes a log message display, which may include, but is not limited to, user identification, processing updates, lock/unlock updates, pin IDs, etc. Accordingly, it should be noted that embodiments of concurrent design process 10 may provide graphical, textual, and log file displays of various locking operations.

In some embodiments, each of the GUIs depicted in the Figures included herein may include a color coded display wherein each individual user has a particular color associated with their operations. For example, the multi-user GUI 2050 may indicate the name of the user as well as the color that corresponds on the display with that particular user's work. Accordingly, embodiments of concurrent design process 10 may be configured to display in real-time any updates that other user's may have made (or may be in the process of making) to the electronic design.

Referring now to FIGS. 21-29, embodiments of concurrent design process 10 may be configured to allow for the locking of objects in order to prevent collisions and allow for a higher predictability of success when updating data. As used herein the phrase "temporary lock" may refer to a lock on an object that may be triggered by a command and that may be removed when the command completes. The phrase "permanent lock" may refer to a lock on an object that may be saved in the database and may persist until removed manually.

Figure 21:
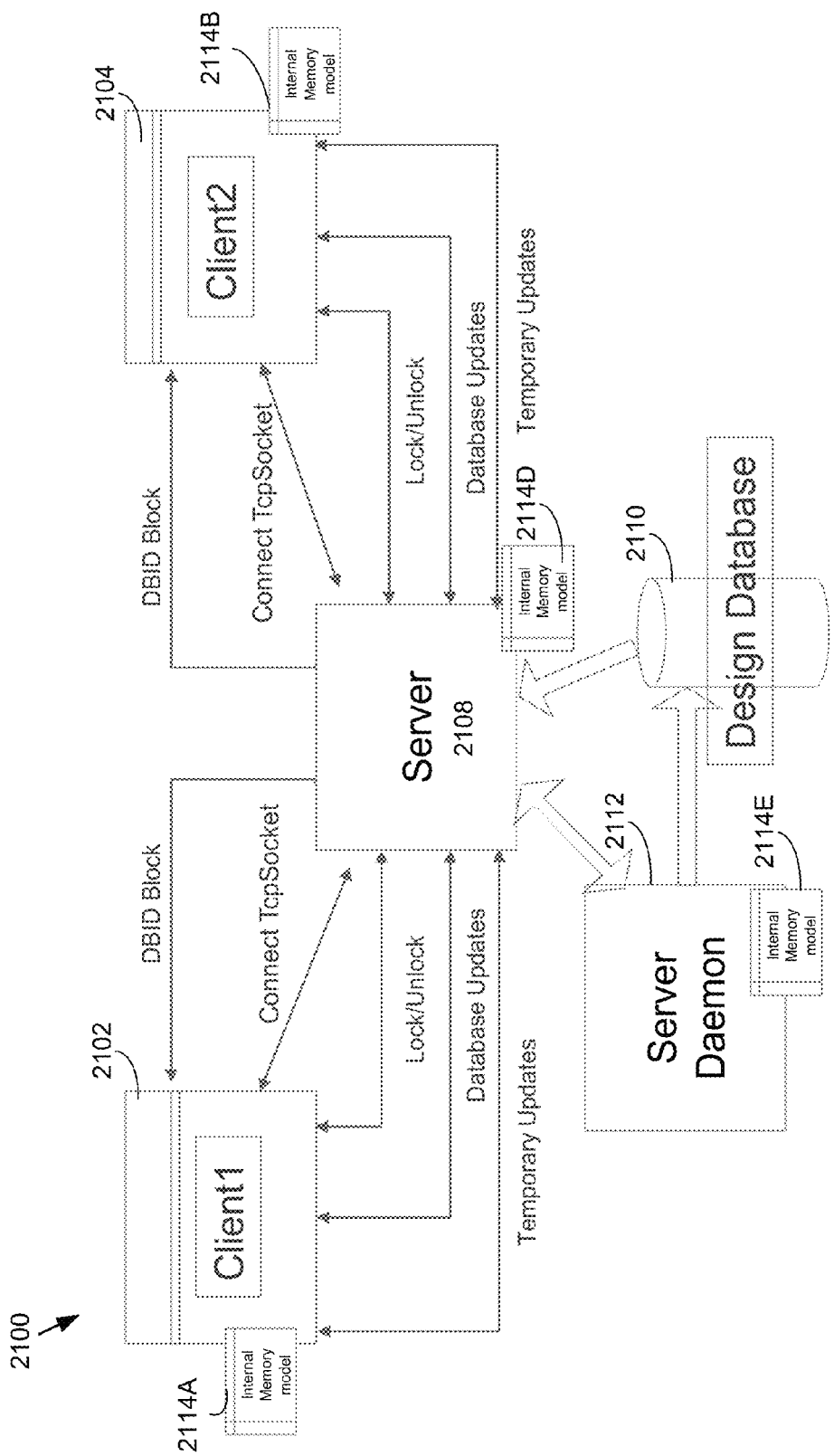
FIG. 21 is a schematic depicting aspects of the concurrent design process in accordance with an embodiment of the present disclosure.

In operation, and as shown in FIG. 21, each client computing device (e.g., 2102 and 2104) may establish a connection with server computing device 2108. Once the connection has been established the client computing devices may join the design session and acquire the design database 2110. In some embodiments, the client computing devices may lock/unlock object(s), send and receive database updates, and send and receive temporary database updates as is discussed in further detail hereinbelow.

Figure 22:
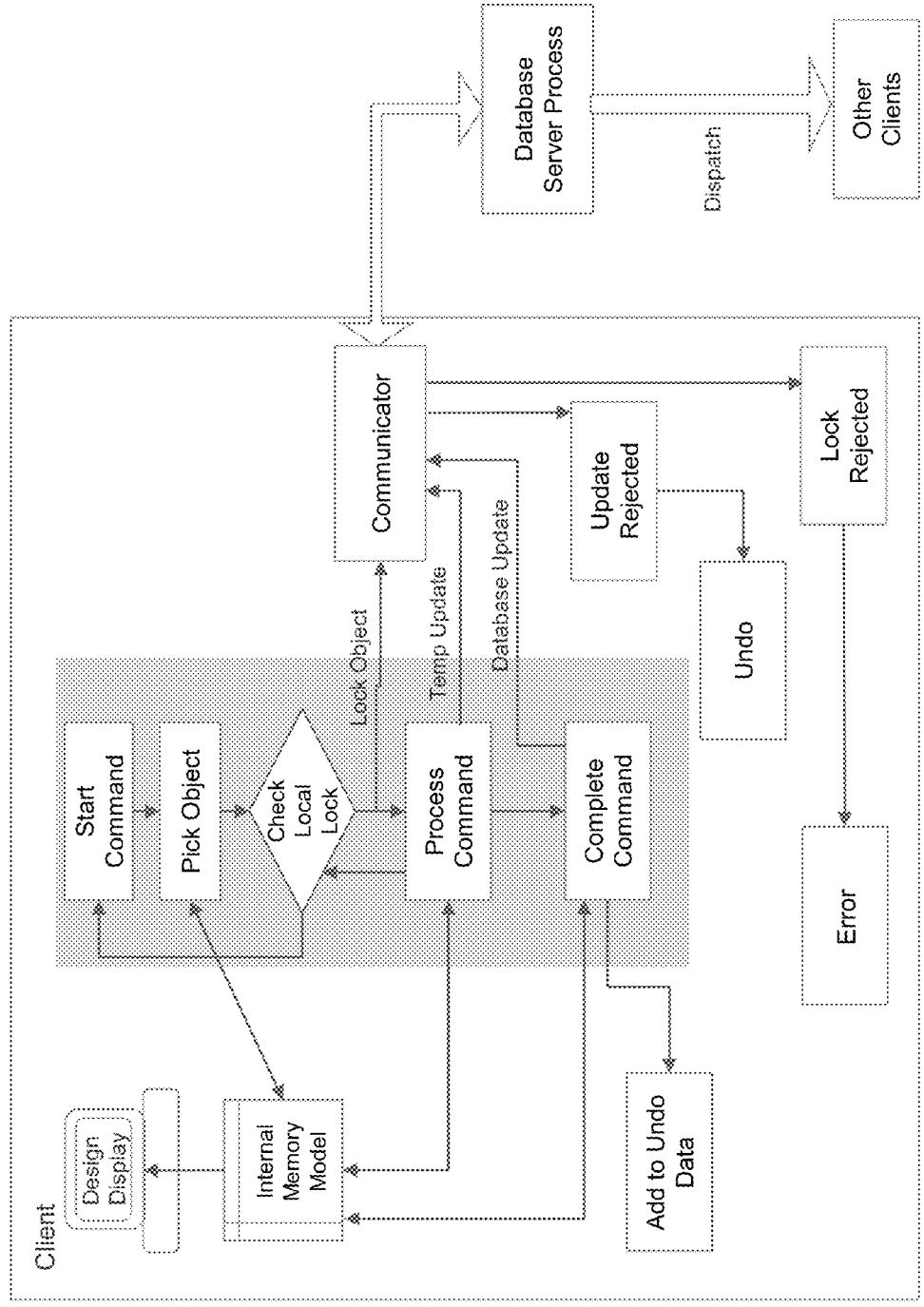
FIG. 22 is a schematic depicting aspects of the concurrent design process in accordance with an embodiment of the present disclosure.

One particular embodiment depicting an example flow of operations consistent with a client-side concurrent design process 10 is shown in FIG. 22. This particular example describes one possible flow of data at one of the client computing devices.

Figure 23:
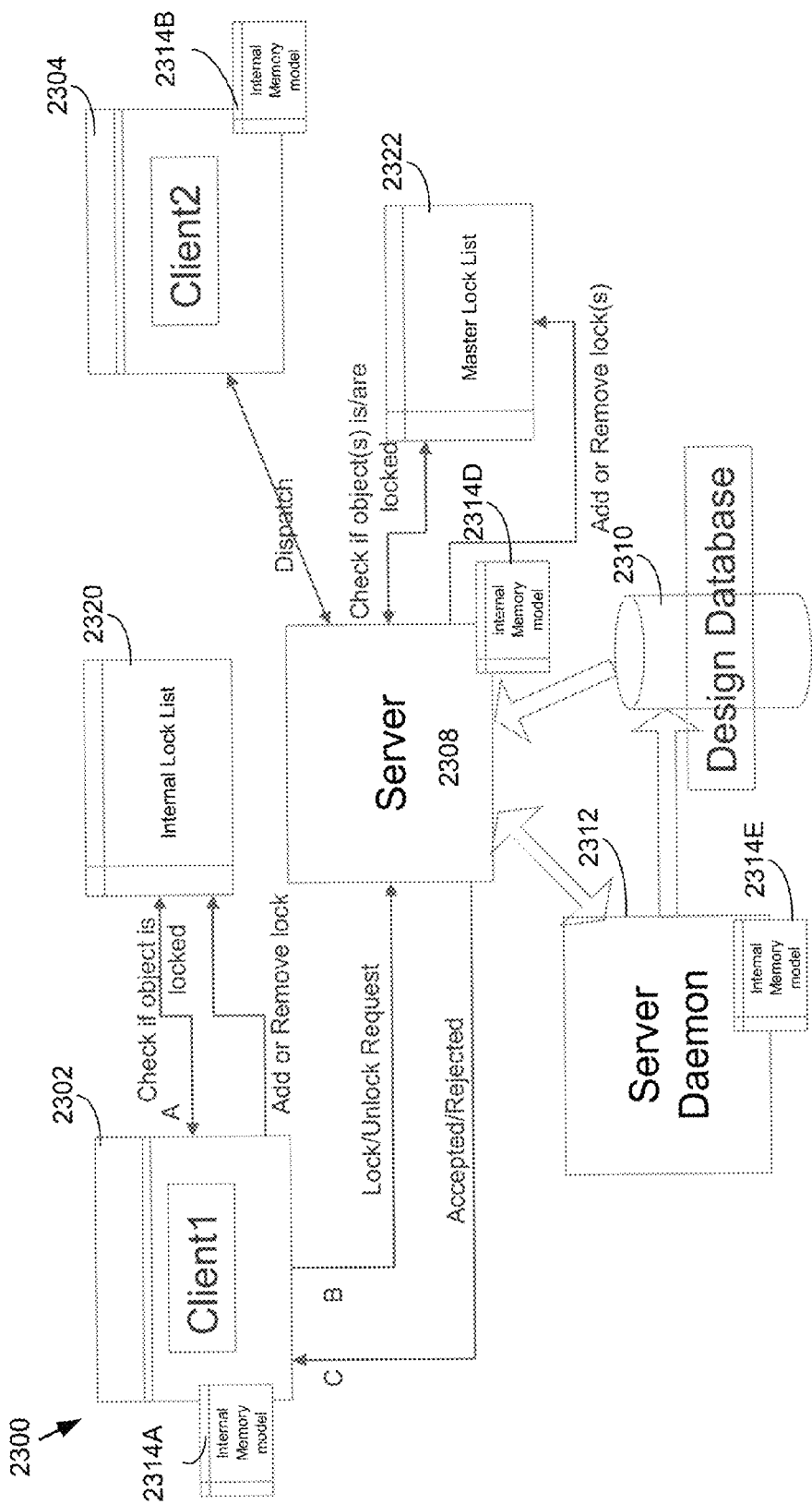
FIG. 23 is a schematic depicting aspects of the concurrent design process in accordance with an embodiment of the present disclosure.

Referring now to FIG. 23, an embodiment of concurrent design process 10 depicting temporary/command locks is depicted. In this particular embodiment, a command requesting an object may first review a local list of locks associated with internal lock list 2320 to avoid communicating with server computing device 2308. Client computing device 2302 may then transmit a lock/unlock request to server computing device 2308. Server computing device 2308 may review master lock list then add or remove the lock from the list. Server computing device 2308 may transmit a message to client computing device 2302 indicating either acceptance or a rejection of the request. Server computing device 2308 may dispatch the update to all of the client computing devices and each may add or remove the lock from their respective local lock list. Concurrent design process 10 may allow for the generation of a command that may generate additional locks during processing.

In some embodiments, client computing device 2302 may not need to wait for server computing device 2308 to respond when lock requests are transmitted. Accordingly, client computing device 2302 may always be prepared to backup if the request is rejected. In this way, concurrent design process 10 may automatically lock and unlock of objects of interest based on a command. In some embodiments, objects associated with an interest hierarchy may also be locked. For example, parent objects and children objects may be linked to the original object and may be automatically locked and/or unlocked upon selection of the original object. Additionally and/or alternatively, concurrent design process 10 may include smart object lock hierarchy checks. Accordingly, parents and children may be considered locked but not siblings, depending on commands.

In some embodiments, concurrent design process 10 may provide real-time updates and visualization of other user's lock with a bitmap on objects locked using different color that may be linked to matching users. The user associated with each client computing device may be allowed to generate an area and to lock all of the objects inside the selected area. Accordingly, any new objects added or moved inside the reserved area may be automatically considered locked.

In some embodiments, concurrent design process 10 may allow for a lock check with a local lock list in order to prevent excessive data transfers and faster response for better chance of success. This fast check for internal locks may be based upon, at least in part, database object properties.

In some embodiments, server computing device 2308 may be configured to release one or more temporary locks upon a command update being accepted or rejected. Concurrent design process 10 may further include the ability to request release of permanent locks, the textual display of lock status per user, and the ability to control the display of locks graphically per user. These are discussed in further detail hereinbelow with reference to FIGS. 24-29.

Figure 24:
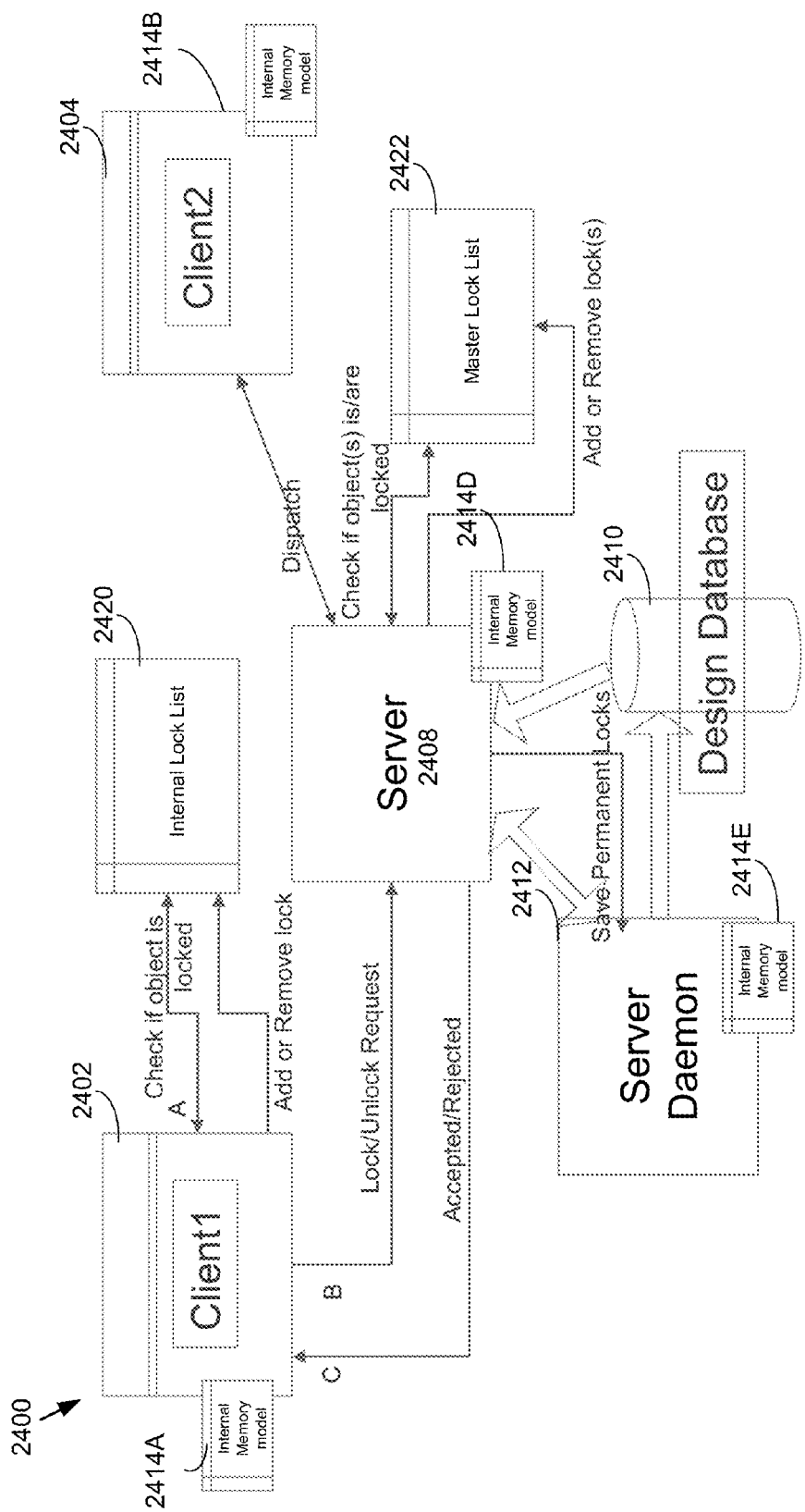
FIG. 24 is a schematic depicting aspects of the concurrent design process in accordance with an embodiment of the present disclosure.

Referring now to FIG. 24, an embodiment of concurrent design process 10 depicting the storage of permanent locks is provided. In operation, client computing device 2402 may receive a command requesting an object and may be configured to first review a local list of locks associated with internal lock list 2420 to avoid accessing server computing device 2408. Client computing device 2402 may then transmit the lock/unlock request to server computing device 2408. Server computing device 2408 may then review master lock list 2422 and then add or remove from list depending upon the review. Server computing device 2408 may then transmit an acceptance or rejection message to client computing device 2402. Server computing device 2408 may also dispatch to all other client computing devices such as client computing device 2404, etc. Each client computing device may then add or removes the lock from their respective local internal lock list. Server computing device 2408 may then transmit a permanent lock to server daemon 2412 for storage in design database 2410.

Figure 25:
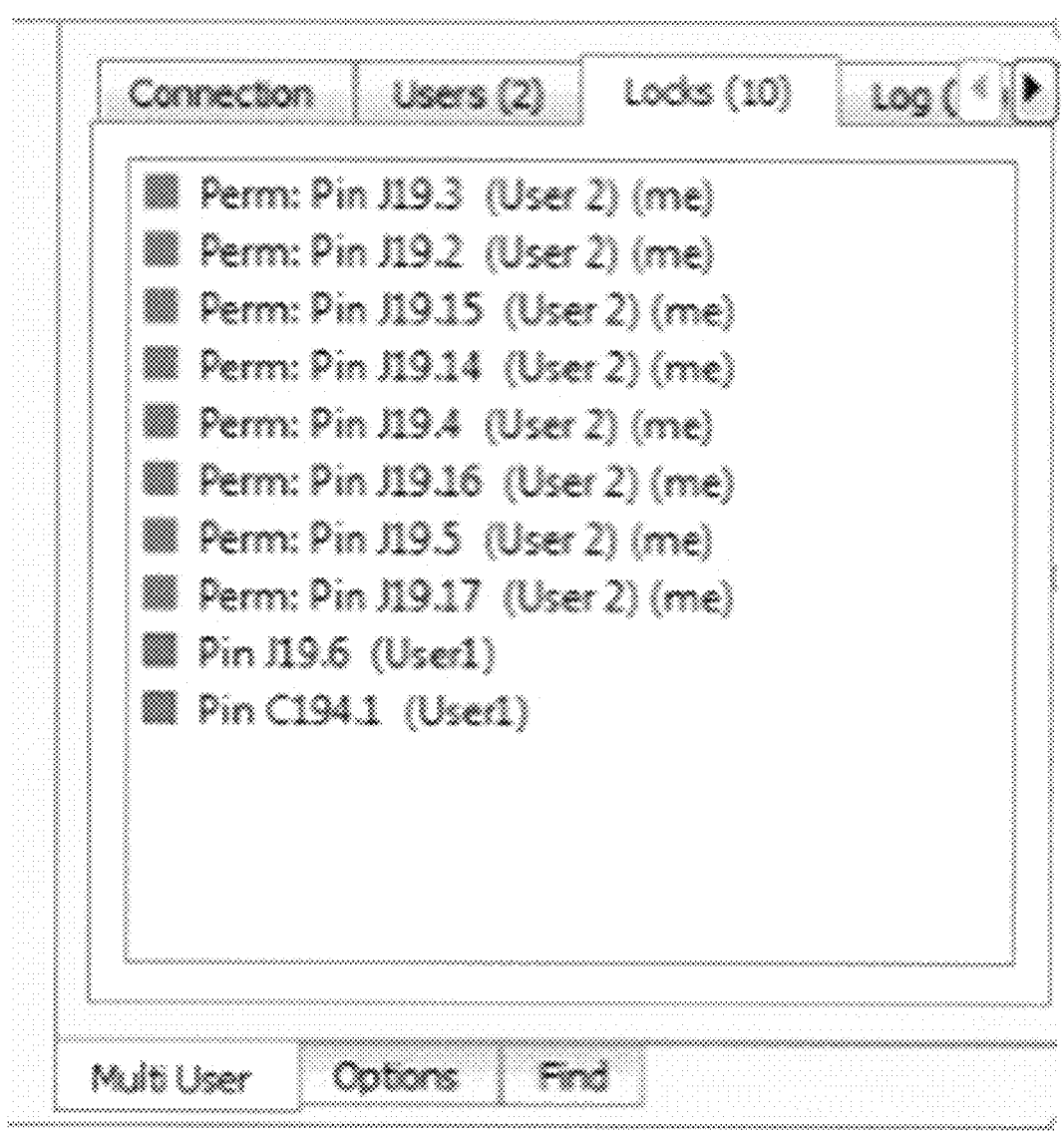
FIG. 25 is a schematic depicting aspects of the concurrent design process in accordance with an embodiment of the present disclosure.

Referring now to FIG. 25, an embodiment of concurrent design process 10 depicting a graphical user interface 2500 is depicted. GUI 2500 may be displayed at any of the computing devices included herein and may be configured to display both temporary and permanent locks. In some embodiments, this may include both the temporary and/or permanent locks on the objects and in the locks list drop down option of the multi-user tab.

Figure 26:
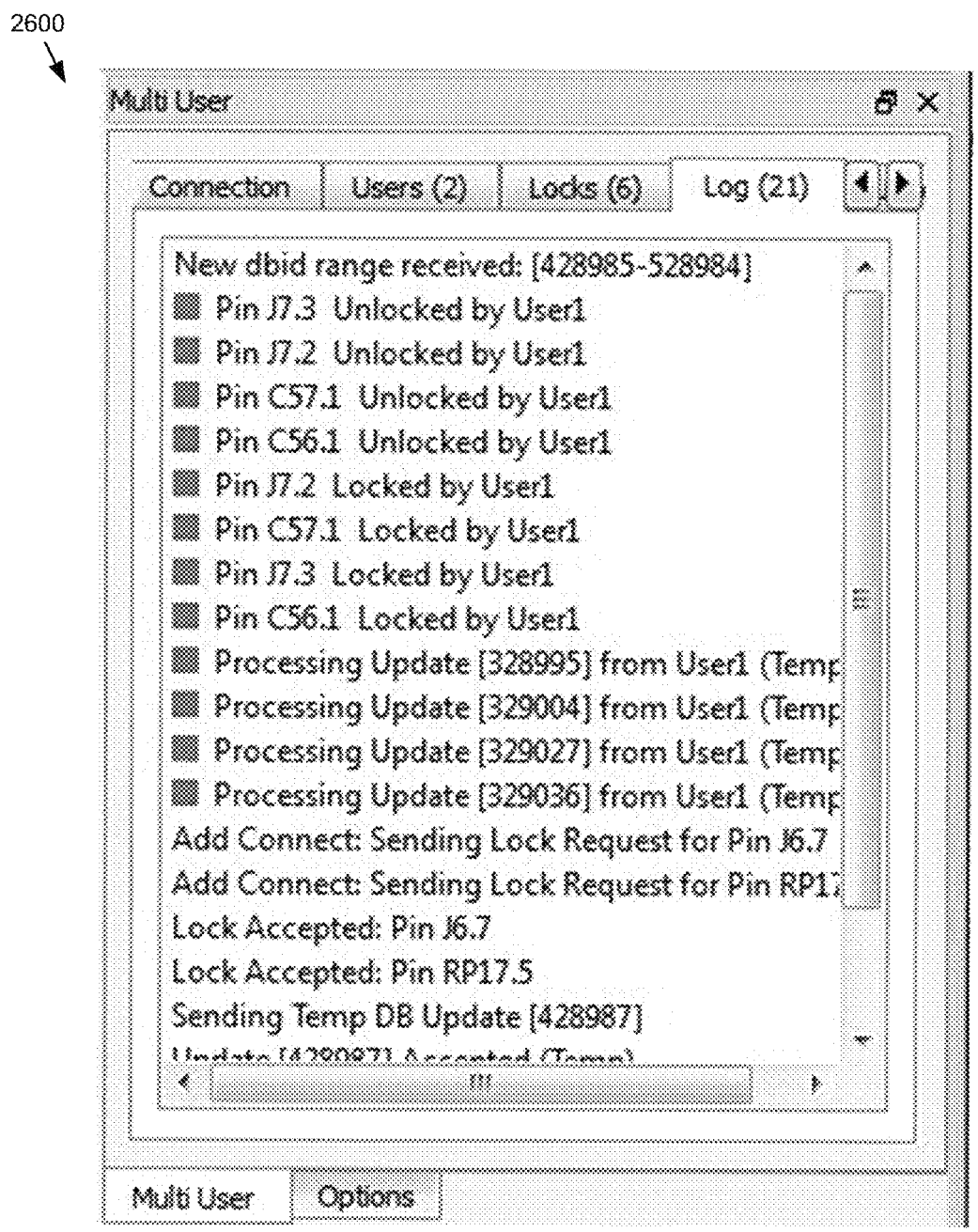
FIG. 26 is a schematic depicting aspects of the concurrent design process in accordance with an embodiment of the present disclosure.

Referring now to FIG. 26, an embodiment of concurrent design process 10 depicting a graphical user interface 2600 is provided. GUI 2600 shows locks and unlocks messages in the log message option of the multi-user tab. As is shown in the Figure, this may include identifying the identity of the particular user associated with each lock or unlock as well as the associated pin. GUI 2600 may further include displaying specific processing updates as well as various other types of information.

Figure 27:
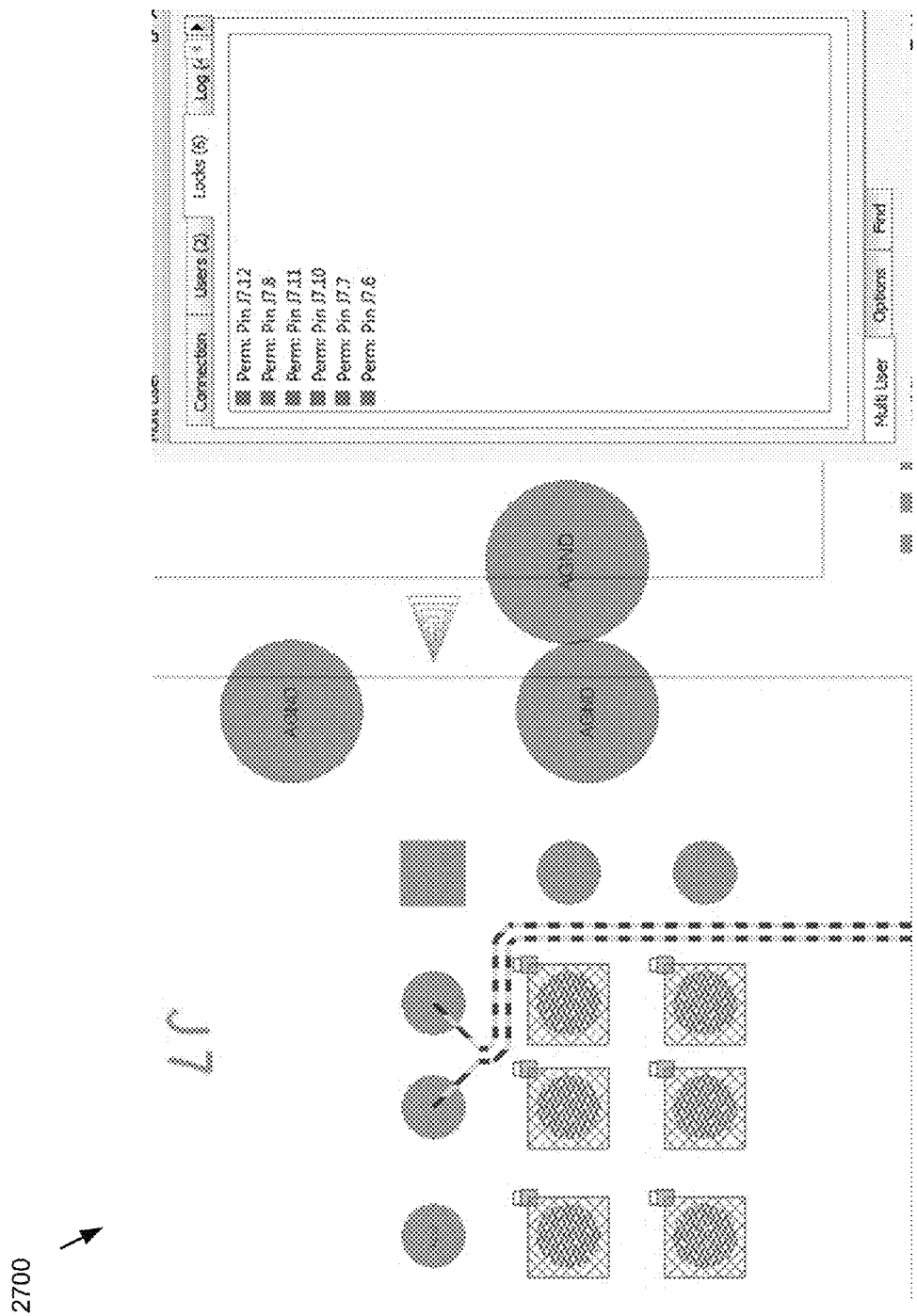
FIG. 27 is a schematic depicting aspects of the concurrent design process in accordance with an embodiment of the present disclosure.

Referring now to FIG. 27, an embodiment of concurrent design process 10 depicting a graphical user interface 2700 is provided. GUI 2700 a portion of an electronic design and also a multi-user tab GUI. The multi-user tab GUI may be configured to display permanent locks both on the objects and in the locks list option of the multi-user tab.

Figure 28:
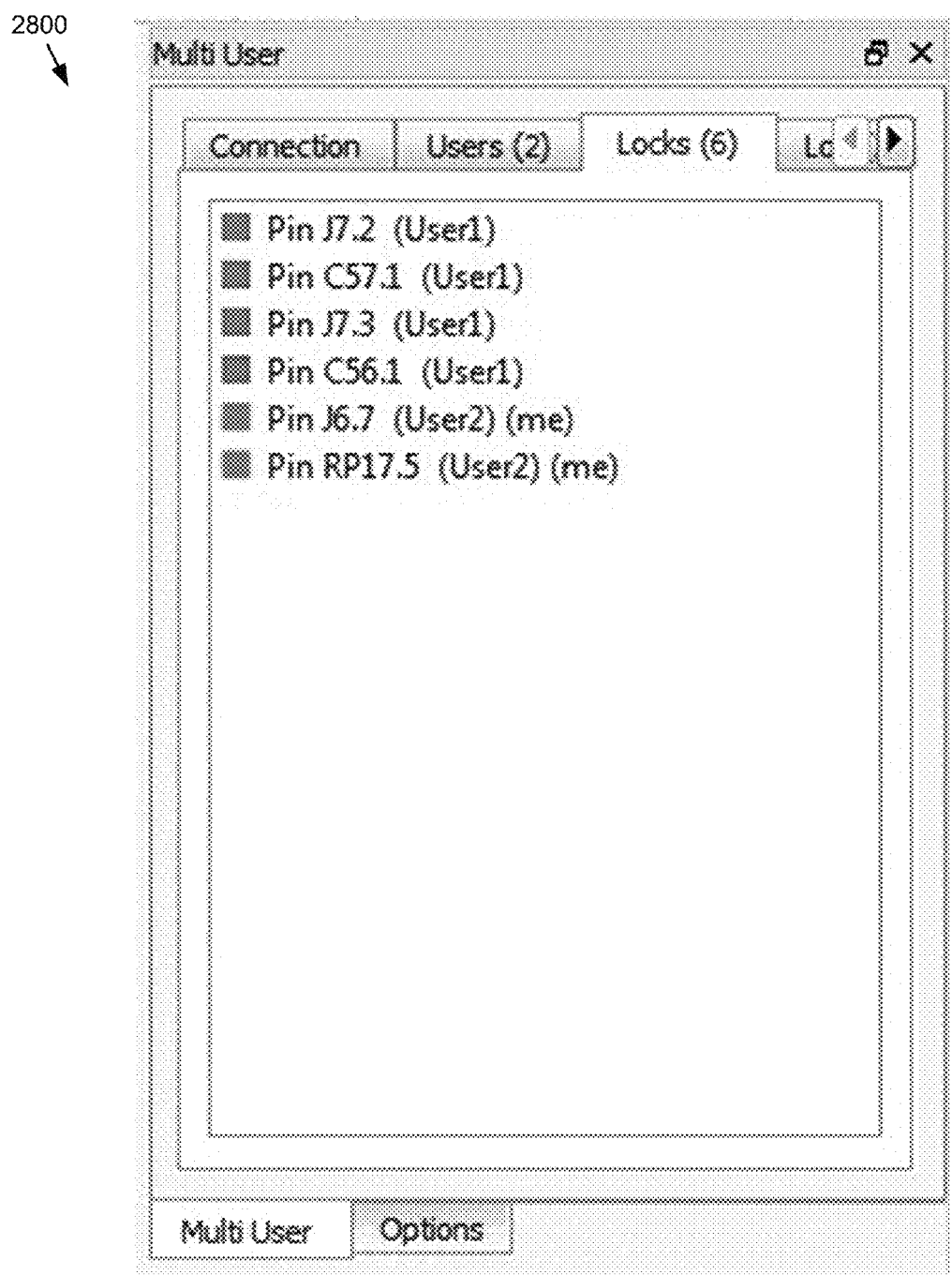
FIG. 28 is a schematic depicting aspects of the concurrent design process in accordance with an embodiment of the present disclosure.

Referring now to FIG. 28, an embodiment of concurrent design process 10 depicting a graphical user interface 2800 is provided. GUI 2800 shows a multi-user tab GUI that may be configured to display one or more locks in the locks list of the multi-user tab. Again, the user's identity may be displayed as well as a color indicator on GUI 2900 that may correlate with the user's actions that may be displayed at a separate interface that shows the electronic design.

Figure 29:
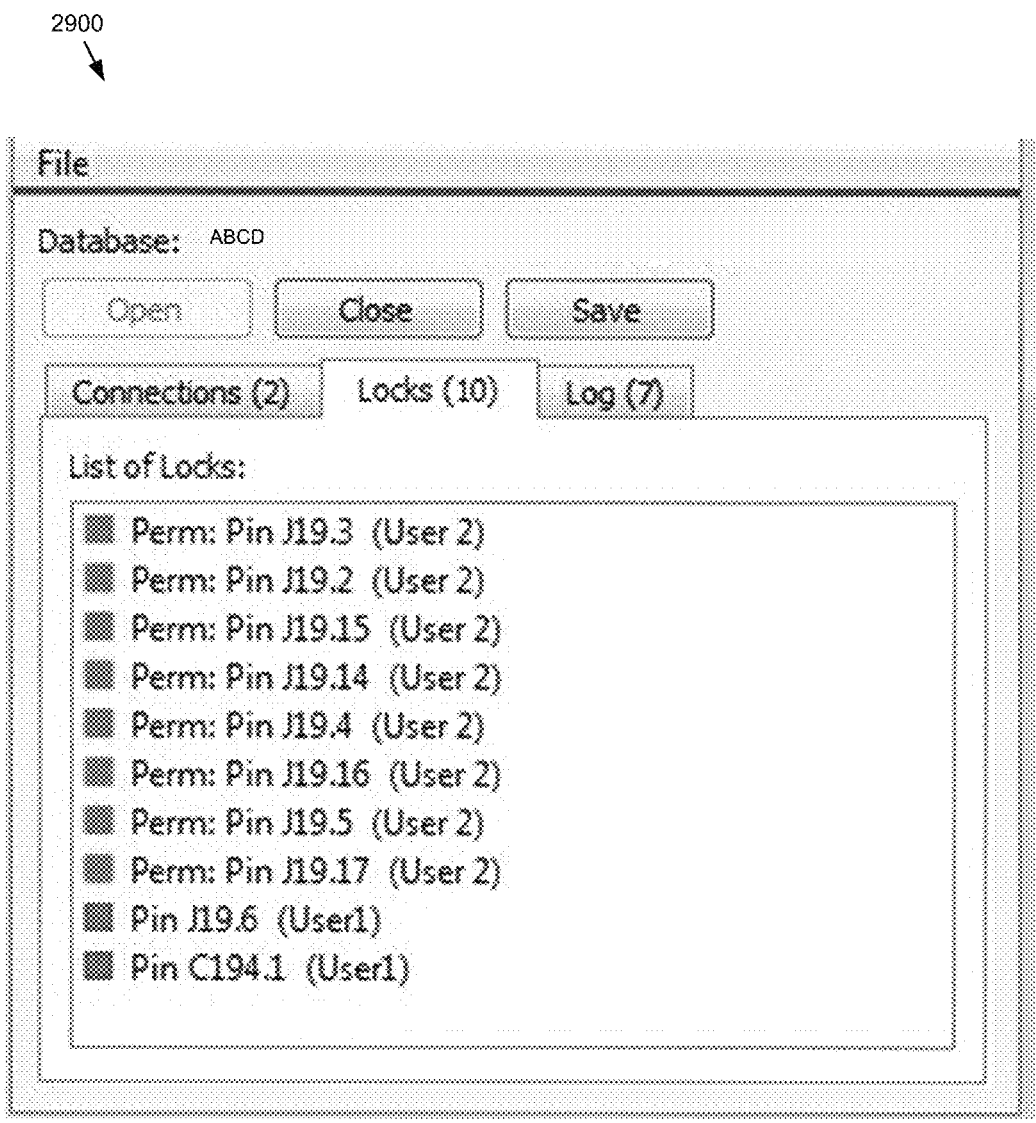
FIG. 29 is a schematic depicting aspects of the concurrent design process in accordance with an embodiment of the present disclosure.
Figure 30:
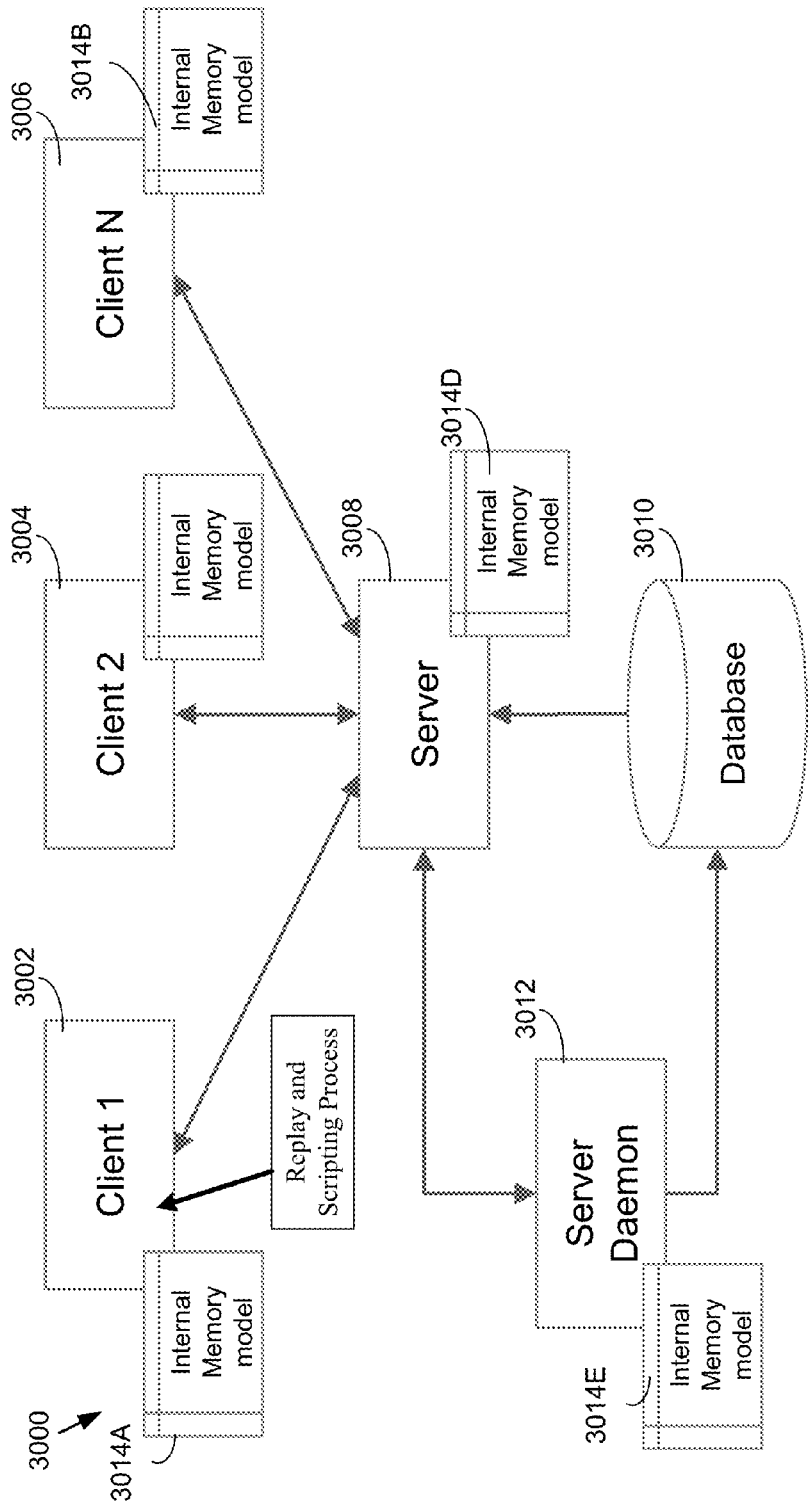
FIG. 30 is a schematic depicting aspects of the concurrent design process in accordance with an embodiment of the present disclosure.

Referring now to FIG. 29, an embodiment of concurrent design process 10 depicting a graphical user interface 2900 is provided. GUI 2900 shows one or more locks in a locks list that may be associated with a server GUI.

Referring now to FIGS. 30-33, embodiments of concurrent design process 10 may be configured to allow users to script and/or replay a multi-user design session. As is discussed in further detail below, concurrent design process 10 may provide the ability to replay a script using only one client and simulating actions from others. In some embodiments, the script may be recorded for a full or partial design session, as desired by the user. Additionally and/or alternatively, the replay of a multi-user session may be replayed without using server computing device 3008 or other client computing devices, for example, client computing device 3002 could generate a replay without client computing devices 3004, 3006, etc. It should also be noted that the scripting and replay operations described herein may operate without focusing upon the particular client computing device or specific user settings/preferences.

As used herein, the phrase a "multi-user script data file" may refer to a binary file containing data to recreate an update received from server computing device 3008. The multi-user script data file may include variable size data packets which are database updates received from the server. Each data packet may be identified by a unique ID.

In some embodiments, concurrent design process 10 may allow for the scripting, recording and replay of a full multi-user design session. Accordingly, data packets received from server computing device 3008 may be saved in a script database for use during replay. Concurrent design process 10 may be configured to record multi-user action in the script as they occur. It should be noted that any user may replay a script recorded by any other user. Additionally and/or alternatively, all client computing devices may be configured to record and replay different scripts and obtain the aggregate result from other users. Updates received from server computing device 3008 may be identified with a unique ID and re-applied to the "playing" database in the order received during recording.

Figure 31:
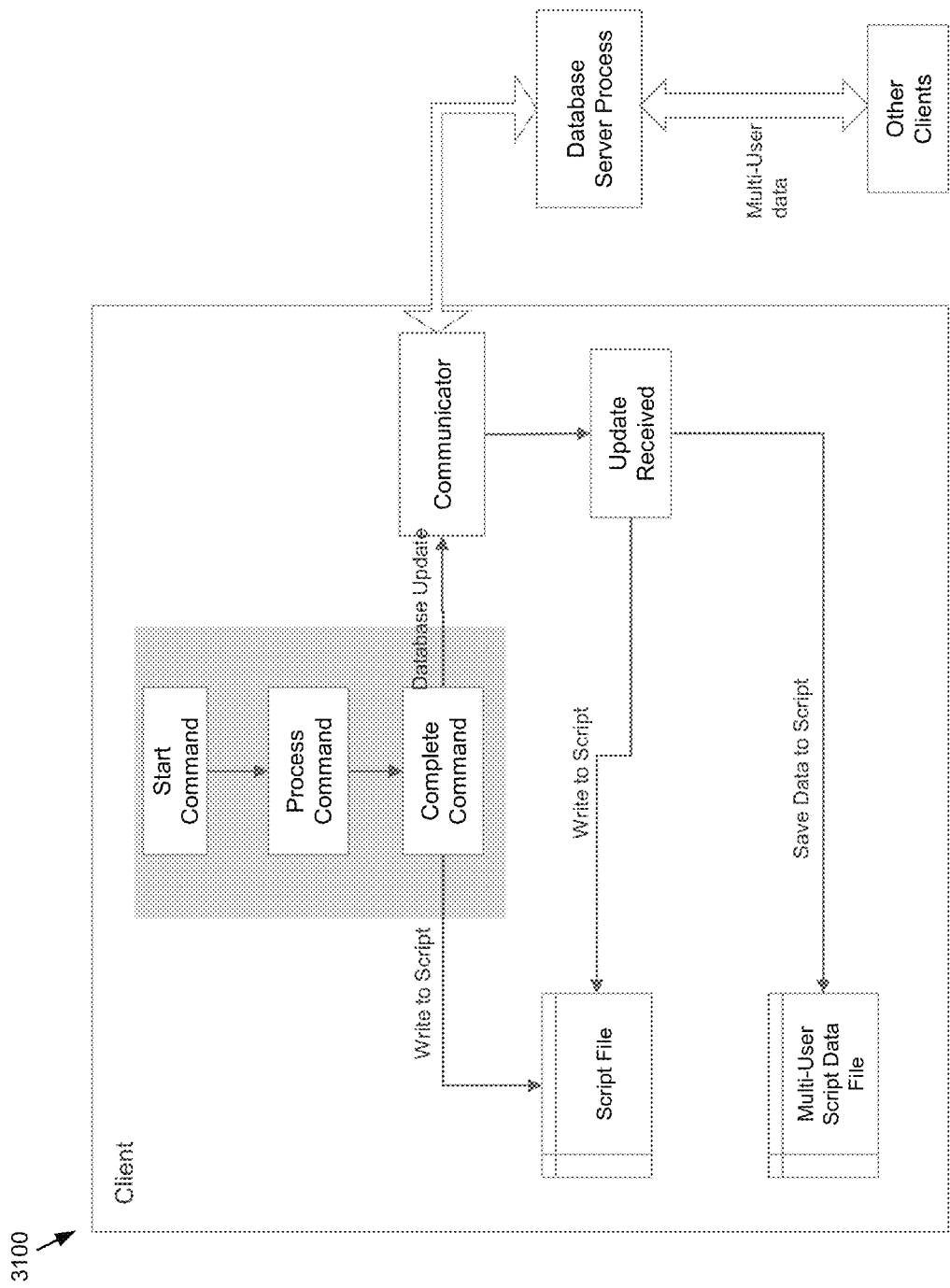
FIG. 31 is a schematic depicting aspects of the concurrent design process in accordance with an embodiment of the present disclosure.

Referring also to FIG. 31, an embodiment of concurrent design process 10 showing operations for multi-user script recording is provided. In operation, at a client computing device 3002 a command may be initiated, processed and completed. The database update may be transmitted to server computing device 3008 using a communicator and the action may be written to the script file. When updates are received from server computing device 3008, the transaction ID may be recorded in the script file. The updated packet may also be transmitted to the multi-user script data file for storage.

Figure 32:
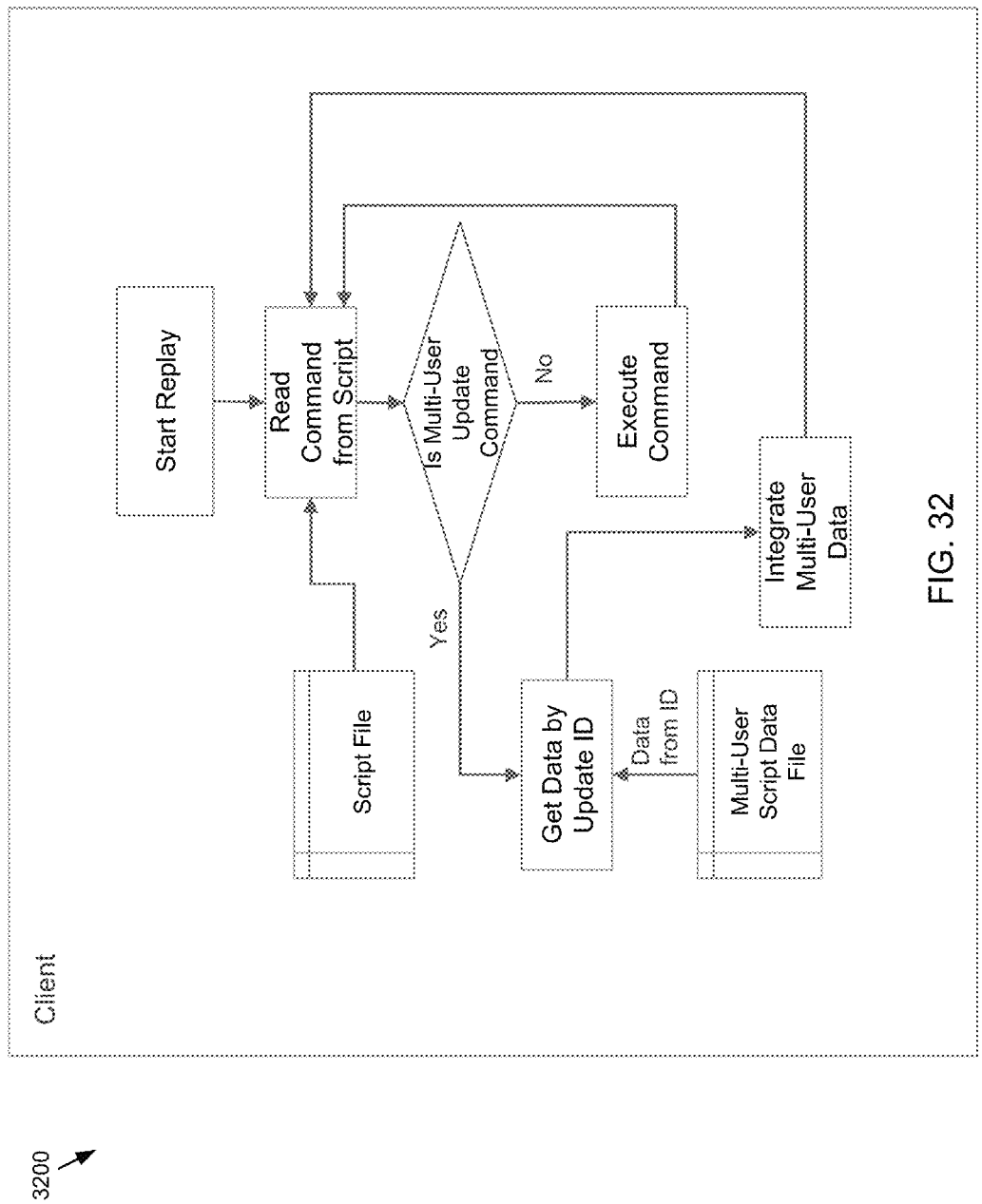
FIG. 32 is a schematic depicting aspects of the concurrent design process in accordance with an embodiment of the present disclosure.

Referring also to FIG. 32, an embodiment of concurrent design process 10 showing operations for multi-user script replaying is provided. In operation, a user may select an option to initiate script replay and read each line. If the command is a multi-user update the transaction packet may be obtained using the update ID and the command may be executed. The process may then repeat to read the next line in the script file. FIG. 33 depicts an embodiment of concurrent design process 10 showing a sample script including a multi-user update received from server computing device 3008 including a unique ID.

Embodiments of concurrent design process 10 may provide a system and method for multi-user/concurrent electronic design. The process may include receiving, at a client computing device, a user input corresponding to a change to an electronic circuit design, wherein the electronic circuit design is accessible by multiple users in an at least partially concurrent manner. The process may further include implementing the change to the electronic circuit design at the client computing device without receiving authorization from a server computing device and transmitting the implemented change to the electronic circuit design to the server computing device.

In some embodiments, implementing the change to the electronic circuit design may include updating a version of the electronic design associated with the client computing device. In some embodiments, implementing the change to the electronic circuit design may include updating a display at a graphical user interface associated with the client computing device. The process may further include receiving, from the server computing device, and after implementation of the change, a rejection of the implemented change. The process may also include storing, at the client computing device, a complete version of printed circuit board data associated with the electronic circuit design. The process may include receiving, from the server computing device, a database identification ("ID") pool specific to the client computing device. In some embodiments, implementing the change to the electronic circuit design at the client computing device and transmitting the implemented change to the electronic circuit design to the server computing device may be at least partially synchronized operations.

Embodiments of concurrent design process 10 may provide a system and method for multi-user/concurrent electronic design. The process may include a system and method for allowing multi-user lock and unlock operations. The process may include storing a lock list at a client computing device, wherein the lock list includes one or more objects associated with an electronic design that have been locked or unlocked. The process may further include receiving, at the client computing device, a user input corresponding to at least one of a lock request or an unlock request associated with an object of the electronic circuit design. The electronic circuit design may be accessible by multiple users in an at least partially concurrent manner. The process may further include transmitting the at least one of the lock request or unlock request to a server computing device and comparing the user input corresponding to at least one of the lock request or unlock request with the lock list. The process may further include determining whether to lock or unlock the object based upon, at least in part, the comparison, wherein determining does not include receiving server authorization.

In some embodiments, the process may further include receiving, from the server computing device, and after the comparison, a rejection of at least one of the lock request or unlock request. Determining whether to lock or unlock the object may include determining whether to lock or unlock at least one parent object or child object associated with the object. The process may also include updating a display at a graphical user interface associated with the client computing device based upon, at least in part, a lock change associated with a second client computing device. The process may also include adjusting an area associated with the electronic design based upon, at least in part, the received user input corresponding to at least one of a lock request or an unlock request. In some embodiments, adjusting an area associated with the electronic design may include at least one of generating a reserved area and removing a reserved area. The reserved area may be configured to designate locked objects.

Embodiments of concurrent design process 10 may provide a system and method for multi-user/concurrent electronic design scripting and replay. The process may include recording, at a client computing device, a plurality of operations associated with an electronic circuit design, wherein the electronic circuit design is accessible by multiple users in an at least partially concurrent manner. The process may include generating a script based upon, at least in part, the recorded operations. The process may further include displaying, at the client computing device, at least a portion of the generated script.

In some embodiments, the recorded operations may include operations from each of the multiple users. The recorded operations may include operations from a user-selected subset of the multiple users. The process may include receiving one or more data packets from a server computing device at a script database associated with the client computing device. Each of the one or more data packets may include a unique identifier ("ID"). The script database may include one or more binary multi-user script data files. In some embodiments, displaying, at the client computing device, at least a portion of the generated script may include displaying a full multi-user electronic circuit design session and the recorded operations of all of the multiple users.

Embodiments of concurrent design process 10 may provide a system and method for multi-user/concurrent electronic design temporary display. The process may include displaying, at a first client computing device associated with a first user, at least a portion of an electronic circuit design, wherein the electronic circuit design is accessible by multiple users in an at least partially concurrent manner. The process may include processing a command at the first client computing device from the first user. The process may further include receiving a temporary update from a server computing device, wherein the temporary update corresponds to a second user associated with a second client computing device. The process may also include displaying, at the first client computing device, an operation corresponding to the received temporary update.

In some embodiments, the temporary update may include one or more temporary objects. The one or more temporary objects may include a partial representation of a database object. The process may further include transmitting, from the first client computing device, a temporary update from the first client computing device to the server computing device. The one or more temporary objects may correspond to real objects in an internal memory model. The internal memory model may include a memory copy of the electronic circuit design that is accessible by both the first client computing device and the server computing device. The temporary update may include a plurality of temporary updates received in real-time, in the order in which they are received at the server computing device. The received temporary update may be included within storage associated with the first client computing device. The received temporary update may ignore one or more preferences associated with the second user or second client computing device.

In some embodiments, EDA application 20 may support a variety of languages and/or standards. Some of these may include, but are not limited to, IEEE-standard languages, the Open Verification Methodology (OVM), the emerging Accellera Universal Verification Methodology (UVM), and the e Reuse Methodology (eRM). EDA application 20 may support one or more software extensions, which may provide a high-throughput channel between the testbench and the device under test (DUT), and enable automated metric driven verification of embedded software exactly as if it were another part of the DUT.

In some embodiments, EDA application 20 may support e, Open Verification Library (OVL), OVM class library, emerging UVM class library, SystemC®, SystemC Verification Library, SystemVerilog, Verilog®, VHDL, PSL, SVA, CPF, as well as numerous other languages. EDA application 20 may be used in accordance with mixed-language, mixed-signal, and low-power designs, across multiple levels of abstraction, and may include the ability to "hot swap" the RTL simulation in/out of numerous accelerators/emulators.

As used in any embodiment described herein, the terms "circuit" and "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof. Embodiments of the present disclosure may be incorporated in whole or in part into any design tools.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for multi-user, at least partially concurrent, electronic circuit design comprising:
   displaying, at a first client computing device associated with a first user, at least a portion of an electronic circuit design layout, wherein the electronic circuit design layout is accessible by multiple users in an at least partially concurrent manner and is associated with the electronic circuit design;
   processing a command at the first client computing device from the first user;
   while the command is processing, receiving a temporary update from a server computing device, wherein the temporary update corresponds to a second user's edit associated with the electronic circuit design layout at a second client computing device; and
   displaying, at the electronic circuit design layout associated with the first client computing device, an operation corresponding to the received temporary update.

2. The computer-implemented method of claim 1, wherein the temporary update includes one or more temporary objects and wherein the one or more temporary objects includes a partial representation of a database object.

3. The computer-implemented method of claim 1, further comprising:
   transmitting, from the first client computing device, a temporary update from the first client computing device to the server computing device.

4. The computer-implemented method of claim 2, wherein the one or more temporary objects correspond to real objects in an internal memory model and wherein the internal memory model includes a memory copy of the electronic circuit design that is accessible by both the first client computing device and the server computing device.

5. The computer-implemented method of claim 1, wherein the temporary update includes a plurality of temporary updates received in real-time, in an order in which they are received at the server computing device.

6. The computer-implemented method of claim 1, wherein the received temporary update is included within a storage associated with the first client computing device.

7. The computer-implemented method of claim 1, wherein the received temporary update ignores one or more preferences associated with the second user or the second client computing device.

8. A non-transitory computer-readable storage medium for a multi-user, at least partially concurrent, electronic circuit design, the non-transitory computer-readable storage medium having stored thereon instructions that, when executed by a machine, cause the machine to perform the following operations:
   displaying, at a first client computing device associated with a first user, at least a portion of an electronic circuit design layout, wherein the electronic circuit design layout is accessible by multiple users in an at least partially concurrent manner and is associated with the electronic circuit design;
   processing a command at the first client computing device from the first user;
   while the command is processing, receiving a temporary update from a server computing device, wherein the temporary update corresponds to a second user's edit associated with the electronic circuit design layout at a second client computing device; and
   displaying, at the electronic circuit design layout associated with the first client computing device, an operation corresponding to the received temporary update.

9. The non-transitory computer-readable storage medium of claim 8, wherein the temporary update includes one or more temporary objects and wherein the one or more temporary objects includes a partial representation of a database object.

10. The non-transitory computer-readable storage medium of claim 8, further comprising:
    transmitting, from the first client computing device, a temporary update from the first client computing device to the server computing device.

11. The non-transitory computer-readable storage medium of claim 9, wherein the one or more temporary objects correspond to real objects in an internal memory model and wherein the internal memory model includes a memory copy of the electronic circuit design that is accessible by both the first client computing device and the server computing device.

12. The non-transitory computer-readable storage medium of claim 8, wherein the temporary update includes a plurality of temporary updates received in real-time, in an order in which they are received at the server computing device.

13. The non-transitory computer-readable storage medium of claim 8, wherein the received temporary update is included within a storage associated with the first client computing device.

14. The non-transitory computer-readable storage medium of claim 8, wherein the received temporary update ignores one or more preferences associated with the second user or the second client computing device.

15. A system for multi-user, at least partially concurrent, electronic circuit design comprising:
    at least one processor configured to display, at a first client computing device associated with a first user, at least a portion of an electronic circuit design layout, wherein the electronic circuit design layout is accessible by multiple users in an at least partially concurrent manner and is associated with the electronic circuit design, wherein the first client computing device is configured to process a command from the first user, wherein, while the command is processing, the first client computing device is configured to receive a temporary update from a server computing device, wherein the temporary update corresponds to a second user's edit associated with the electronic circuit design layout at a second client computing device, wherein the first client computing device is configured to display an operation corresponding to the received temporary update at the electronic circuit design layout associated.

16. The system of claim 15, wherein the temporary update includes one or more temporary objects and wherein the one or more temporary objects includes a partial representation of a database object.

17. The system of claim 15, wherein the first client computing device is configured to transmit a temporary update from the first client computing device to the server computing device.

18. The system of claim 16, wherein the one or more temporary objects correspond to real objects in an internal memory model and wherein the internal memory model includes a memory copy of the electronic circuit design that is accessible by both the first client computing device and the server computing device.

19. The system of claim 15, wherein the temporary update includes a plurality of temporary updates received in real-time, in an order in which they are received at the server computing device.

20. The system of claim 15, wherein the received temporary update is included within a storage associated with the first client computing device.

* * * * *